(12) United States Patent
Hamada

(10) Patent No.: US 9,298,063 B2
(45) Date of Patent: Mar. 29, 2016

(54) LIGHTING DEVICE AND PHOTOGRAPHING SYSTEM INCLUDING THE SAME

(71) Applicant: SAMSUNG ELECTRONICS CO., LTD., Suwon-si, Gyeonggi-do (KR)

(72) Inventor: Masataka Hamada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 417 days.

(21) Appl. No.: 13/773,909

(22) Filed: Feb. 22, 2013

(65) Prior Publication Data

US 2013/0235551 A1    Sep. 12, 2013

(30) Foreign Application Priority Data

Mar. 6, 2012  (KR) .................. 10-2012-0022885

(51) Int. Cl.
*G03B 15/03* (2006.01)
*G03B 15/02* (2006.01)
*H04N 5/232* (2006.01)
*H04N 5/235* (2006.01)

(52) U.S. Cl.
CPC ............... *G03B 15/02* (2013.01); *H04N 5/232* (2013.01); *H04N 5/2354* (2013.01)

(58) Field of Classification Search
USPC ................ 396/109; 348/371, 208.12; 362/11
See application file for complete search history.

(56) References Cited

U.S. PATENT DOCUMENTS

| 4,901,101 A | * | 2/1990 | Ishida | G02B 7/34 396/93 |
|---|---|---|---|---|
| 6,584,283 B2 | * | 6/2003 | Gabello | G01S 7/4814 348/135 |
| 6,822,687 B1 | * | 11/2004 | Kakiuchi | G01C 3/08 348/207.99 |
| 7,303,308 B2 | * | 12/2007 | Amphlett | G03B 15/03 362/16 |
| 8,063,977 B2 | * | 11/2011 | Nakagawa | 348/345 |
| 2002/0172514 A1 | * | 11/2002 | Gabello et al. | 396/109 |
| 2005/0174475 A1 | * | 8/2005 | Yoshida | 348/370 |
| 2006/0257130 A1 | | 11/2006 | Lee et al. | |
| 2013/0155644 A1 | * | 6/2013 | Hamada | 362/11 |

FOREIGN PATENT DOCUMENTS

JP    2003-140027 A    5/2003

OTHER PUBLICATIONS

Extended European Search Report issued for EP 13156238.1 (Aug. 8, 2014).

* cited by examiner

*Primary Examiner* — Clayton E Laballe
*Assistant Examiner* — Warren K Fenwick
(74) *Attorney, Agent, or Firm* — Drinker Biddle & Reath LLP

(57) ABSTRACT

A photographing system including a photographing device for capturing an image, and a lighting device that is capable of being mounted on the photographing device is provided. The lighting device includes a plurality of light sources configured as a solid state light-emitting device, and has a photographing auxiliary light function for allowing the solid state light-emitting device to be turned on to emit light during photographing and an autofocus (AF) auxiliary light function for allowing the solid state light-emitting device to be turned on to emit a predetermined amount of light when contrast AF is performed. And at least part of the light sources is shared when the photographing auxiliary light function and the AF auxiliary light function are performed.

21 Claims, 20 Drawing Sheets

LIGHTING DEVICE AND PHOTOGRAPHING SYSTEM INCLUDING THE SAME

CROSS-REFERENCE TO RELATED PATENT APPLICATION

This application claims the priority benefit of Korean Patent Application No. 10-2012-0022885, filed on Mar. 6, 2012, in the Korean Intellectual Property Office, which is incorporated herein in its entirety by reference.

BACKGROUND

1. Field

The invention relates to a lighting device and a photographing system including the same.

2. Description of the Related Art

As digital photographing apparatuses, such as digital cameras, camcorders, or the like have been miniaturized, and as technology relating to a battery, or the like has been developed, digital photographing apparatuses have become more easily carried. Thus, an image can be easily captured anywhere. In addition, digital photographing apparatuses provide a wide variety of functions that enable non-professionals to capture a good quality image.

In order to capture a good quality image of a subject, light has to be sufficiently irradiated onto the subject. When light is not sufficiently irradiated onto a subject, it is not easy to focus on the subject and a captured image is dark, and thus it is not easy to recognize the photographed subject. Thus, a lighting device for lighting a subject may be embedded in a digital photographing apparatus or may be separately installed at the digital photographing apparatus as occasion demands.

SUMMARY

The invention provides a lighting device that may irradiate photographing auxiliary light and autofocus (AF) auxiliary light onto a subject efficiently, and a photographing system including the lighting device.

According to an aspect of the invention, there is provided a photographing system including: a photographing device for capturing an image; and a lighting device that is capable of being mounted on the photographing device, wherein the lighting device includes a plurality of light sources configured as a solid state light-emitting device, and has a photographing auxiliary light function for allowing the solid state light-emitting device to be turned on to emit light during photographing and an autofocus (AF) auxiliary light function for allowing the solid state light-emitting device to be turned on to emit a predetermined amount of light when contrast AF is performed, and wherein at least part of the light sources is shared when the photographing auxiliary light function and the AF auxiliary light function are performed.

The photographing device may further include an auxiliary light device to be turned on to emit light when contrast AF is performed, and when the lighting device is not mounted on the photographing device, the auxiliary light device may be turned on to emit light, and when the lighting device is mounted on the photographing device, the lighting device may be turned on to emit light using the AF auxiliary light function.

The solid state light-emitting device may include one selected from the group consisting of a light emitting diode (LED), an electroluminescence (EL) display, an organic light emitting diode (OLED) device, and an organic light emitting transistor (OLET).

The photographing auxiliary light function may allow all light sources of the solid state light-emitting device to emit light, and the AF auxiliary light function may allow a particular light source or all light sources of the solid state light-emitting device to emit light.

The particular light source may include a particular color or white light source, or a light source disposed in a region that covers a focus detection region.

The lighting device may further include a xenon lamp as a light source, and the photographing auxiliary light function may allow all light sources of the solid state light-emitting device and the xenon lamp to emit light.

The photographing device may further include a shutter for controlling exposure, and when the photographing auxiliary light function is performed, emission of the solid state light-emitting device may start before the shutter is open, and after the shutter is closed, emission of the solid state light-emitting device may be terminated.

When the lighting device is mounted on the photographing device, if it is determined that the lighting device is necessary to perform AE, the photographing device may allow the solid state light-emitting device of the lighting device to be turned on to emit light.

When the lighting device is mounted on the photographing device, if it is determined that monitoring of a subject is necessary, the photographing device may allow the solid state light-emitting device of the lighting device to be turned on to emit light.

When the AF auxiliary light function is performed, an emission instruction signal may be received or transmitted from or to the photographing device and the lighting device.

When the AF auxiliary light function is performed, emission color information may be received or transmitted from or to the photographing device and the lighting device.

The lighting device during moving picture capturing may be turned on to emit light with a lower voltage or current than in still image capturing.

The photographing auxiliary light function may be performed when brightness of a subject is equal to or less than a first reference value, and the AF auxiliary light function may be performed when brightness of the subject is equal to or less than a second reference value or when a focus evaluation value cannot be obtained.

According to another aspect of the invention, there is provided a lighting device that is capable of being mounted on a photographing device, the lighting device including: a plurality of light sources configured as a solid state light-emitting device, wherein the lighting device has a photographing auxiliary light function for allowing the solid state light-emitting device to be turned on to emit light during photographing and an autofocus (AF) auxiliary light function for allowing the solid state light-emitting device to be turned on to emit a predetermined amount of light when contrast AF is performed, and wherein at least part of the light sources is shared when the photographing auxiliary light function and the AF auxiliary light function are performed.

The solid state light-emitting device may be controlled to be turned on to emit a predetermined amount of light using a static voltage circuit or a static current circuit.

The photographing auxiliary light function may allow all light sources of the solid state light-emitting device to emit light, and the AF auxiliary light function may allow a particular light source or all light sources of the solid state light-emitting device to emit light.

The lighting device during moving picture capturing may be turned on to emit light with a lower voltage or current than in still image capturing.

The photographing auxiliary light function may be performed when brightness of a subject is equal to or less than a first reference value, and the AF auxiliary light function may be performed when brightness of the subject is equal to or less than a second reference value or when a focus evaluation value cannot be obtained.

The solid state light-emitting device may include one selected from the group consisting of a light emitting diode (LED), an electroluminescence (EL) display, an organic light emitting diode (OLED) device, and an organic light emitting transistor (OLET).

The lighting device may further include a xenon lamp as a light source, and the photographing auxiliary light function may allow all light sources of the solid state light-emitting device and the xenon lamp to emit light.

According to another aspect of the invention, there is provided a lighting device that is capable of being mounted on a photographing device, the lighting device including: a plurality of light sources configured as a solid state light-emitting device, wherein the lighting device has a photographing auxiliary light function for allowing the solid state light-emitting device to be turned on to emit light during photographing and an autofocus (AF) auxiliary light function for allowing the solid state light-emitting device to be turned on to emit on a predetermined condition when contrast AF is performed, and wherein the solid state light-emitting device during moving picture capturing is turned on to emit light with a lower voltage or current than in still image capturing.

BRIEF DESCRIPTION OF THE DRAWINGS

The above and other features and advantages of the invention will become more apparent upon review of detail exemplary embodiments thereof with reference to the attached drawings in which.

DETAILED DESCRIPTION

Figure 1:
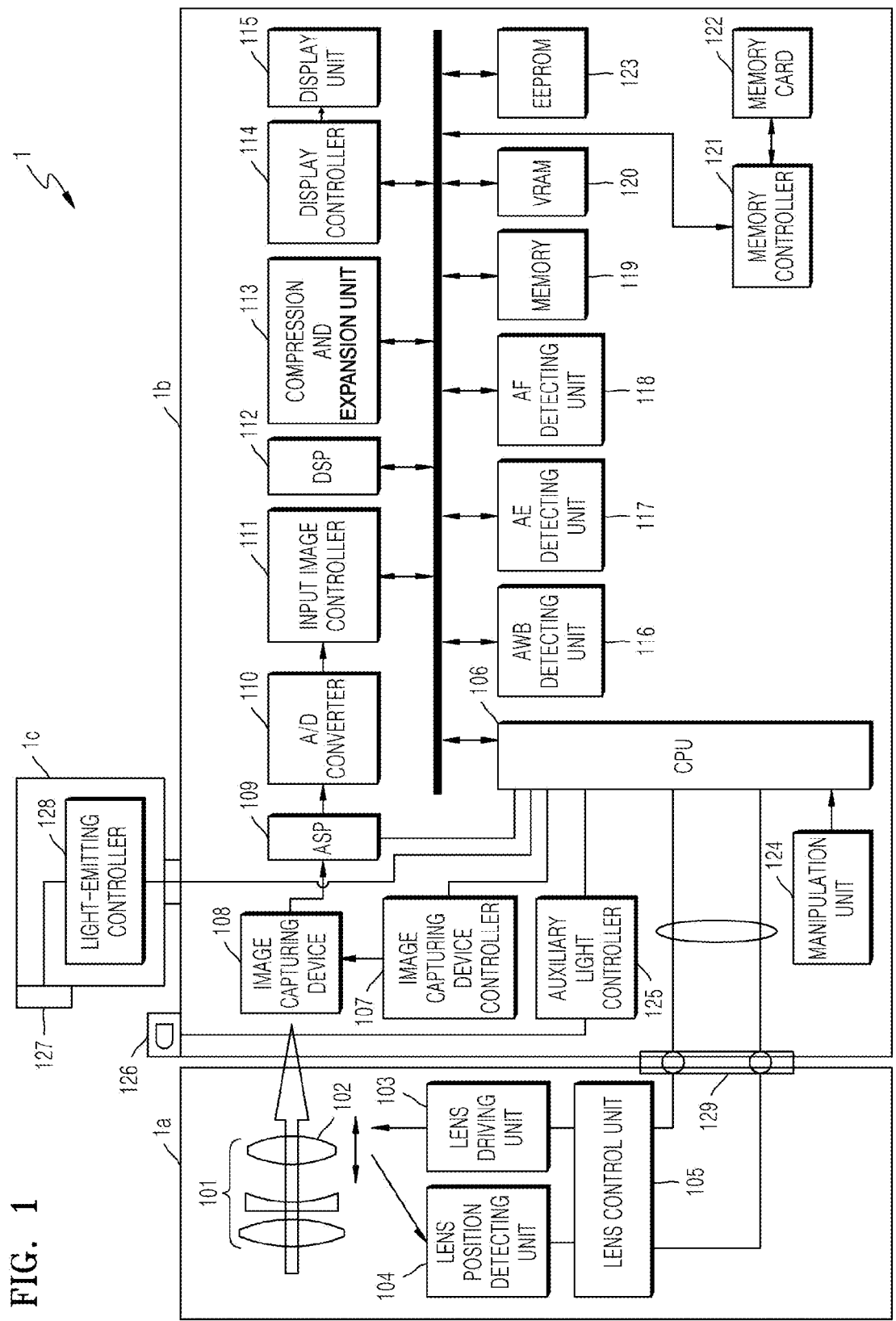
FIG. 1 is a block diagram of a structure of a photographing system according to an embodiment of the invention.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of this disclosure are encompassed in the invention.

The invention will be described below in more detail with reference to the accompanying drawings, in which exemplary embodiments of the invention are shown. Those components that are the same or are in correspondence are rendered using the same reference numeral regardless of the figure number, and redundant explanations are omitted.

FIG. 1 is a block diagram of a photographing system 1 according to an embodiment of the invention. The photographing system 1 of FIG. 1 is a digital photographing apparatus in which a main body 1b and a lens unit 1a may be separated from each other. Alternatively, the lens unit 1a may be integral with the main body 1b.

Referring to FIG. 1, the photographing system 1 includes a photographing device that includes the lens unit 1a and the main body 1b and captures an image, and a lighting device 1c that is connected to the photographing device. In the present embodiment, the lens unit 1a may be attached to or detached from the main body 1b using a lens mount 129, and the lighting device 1c may be attached to or detached from the main body 1b.

The lens unit 1a includes an image capturing lens 101, a lens driving unit 103, a lens position detecting unit 104, and a lens control unit 105.

The image capturing lens 101 includes a focus lens 102, and focusing may be performed by driving the focus lens 102.

The lens driving unit 103 drives the focus lens 102 in response to control performed by the lens control unit 105, and the lens position detecting unit 104 detects a position of the focus lens 102 and transmits information regarding the position of the focus lens 102 to the lens control unit 105.

The lens control unit 105 controls an operation of the lens driving unit 103 and receives position information from the lens position detecting unit 104. In addition, the lens control unit 105 exchanges information regarding focus detection by communicating with a central processing unit (CPU) 106.

The main body 1b includes the CPU 106, an image capturing device controller 107, an image capturing device 108, an analog signal processor (ASP) 109, an analog-to-digital (A/D) converter 110, an image input controller 111, a digital signal processor (DSP) 112, a compression and expansion unit 113, a display controller 114, a display unit 115, an auto white balance (AWB) detecting unit 116, an auto exposure (AE) detecting unit 117, an autofocus (AF) detecting unit 118, memory 119, video random access memory (VRAM) 120, a memory controller 121, a memory card 122, electrically erasable programmable read-only memory (EEPROM) 123, a manipulation unit 124, an auxiliary light controller 125, and an AF auxiliary light device 126.

The CPU 106 controls the entire operation of the photographing system 1.

The image capturing device controller 107 generates a timing signal and applies the timing signal to the image capturing device 108, thereby controlling an image capturing operation of the image capturing device 108. In addition, as charge accumulation is completed in each of scan lines of the image capturing device 108, the image capturing device controller 107 controls the image capturing device 108 to sequentially read image signals from the image capturing device 108.

The image capturing device 108 captures image light of a subject that passes through the image capturing lens 101 and generates an image signal. The image capturing device 108 may include a plurality of photoelectric conversion devices arranged in the form of a matrix, and a charge transmission path on which charges are moved from the photoelectric conversion devices.

The ASP 109 removes noise from an image signal read from the image capturing device 108 or amplifies a magnitude of the image signal. The A/D converter 110 converts an analog image signal output from the ASP 109 into a digital image signal. In addition, the image input controller 111 allows an image signal output from the A/D converter 110 to be image processed by each of elements in the future.

AWB processing, AE processing, and AF processing are performed on an image signal output from the image input controller 111 using the AWB detecting unit 116, the AE detecting unit 117, and the AF detecting unit 118, respectively.

An image signal output from the image input controller 111 may be temporarily stored in the memory 119, which may be synchronous dynamic RAM (SDRAM).

The DSP 112 performs a series of image signal processing, such as gamma correction, on an image signal output from the image input controller 111 to generate a live view image or a captured image that may be displayed by the display unit 115. In addition, the DSP 112 may perform white balance control of a captured image according to a white balance gain detected by the AWB detecting unit 116.

The compression and expansion unit 113 performs compression and expansion of an image signal on which image signal processing has been performed. In the case of compression, the compression and expansion unit 113 compresses the image signal in a compression format, such as a JPEG compression format or an H.264 compression format. An image file including image data generated by the compression processing is transmitted to the memory controller 121, and the memory controller 121 stores the image file in the memory card 122.

The display controller 114 controls an image output to the display unit 115. The display unit 115 displays an image, such as a captured image or a live view image, or various setting information. The display unit 115 and the display controller 114 may include a liquid crystal display (LCD) and an LCD driver, respectively. However, aspects of the invention are not limited thereto, and the display unit 115 and the display controller 114 may be an organic electroluminescent display (OELD) and a driving unit thereof, or the like.

The VRAM 120 stores information, such as an image to be displayed on the display unit 115 temporarily, and the EEPROM 123 may store a program for controlling the photographing system 1, or various management information.

The manipulation unit 124 is a unit for inputting various commands from a user in order to manipulate the photographing system 1. The manipulation unit 124 may include various buttons, such as a shutter release button, a main switch, a mode dial, a menu button, and the like.

The auxiliary light controller 125 is a circuit for controlling emission of the auxiliary light device 126. The auxiliary light controller 125 controls the auxiliary light device 126 to irradiate photographing auxiliary light used in main photographing or AF auxiliary light used in performing contrast AF onto a subject.

The auxiliary light device 126 irradiates light onto a subject. The auxiliary light device 126 is embedded in the main body 1b. The auxiliary light device 126 may include a solid state light-emitting device, such as a light emitting diode (LED), an electroluminescence (EL) display, an organic light emitting diode (OLED) device, or an organic light emitting transistor (OLET).

The lighting device 1c may be attached to or detached from the main body 1b and may be mounted on the main body 1b via an assembly, for example, an accessory shoe. The lighting device 1c includes a light emitting unit 127 and a light-emitting controller 128.

The light-emitting controller 128 is a circuit for driving photographing auxiliary light or AF auxiliary light that drives the light emitting unit 127 to irradiate light emitted from a light source of the light emitting unit 127 onto a subject during photographing or AF driving.

The light emitting unit 127 is a unit that emits auxiliary light for AF driving or photographing. The light emitting unit 127 may include a solid state light-emitting device, such as an LED, an OLED, an EL display, or an OLET, as a light source. Alternatively, the light emitting unit 127 may further include a xenon lamp instead of the solid state light-emitting device, as a light source.

The light emitting unit 127 has an AF auxiliary light function and a photographing auxiliary light function. The light-emitting controller 128 controls the light emitting unit 127 as the solid state light-emitting device to emit a predetermined amount of light when contrast AF is performed. In addition, the light emitting controller 128 controls the light emitting unit 127 to emit light for main photographing when main photographing is performed.

Figure 2:
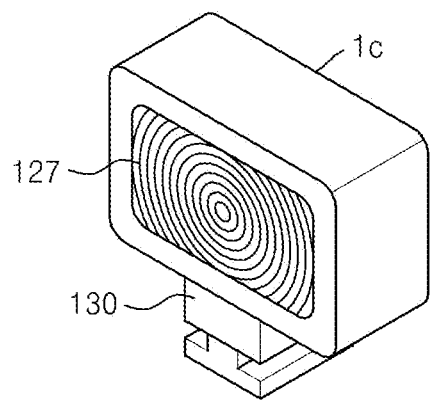
FIG. 2 is a view of a lighting device according to an embodiment of the invention.

FIG. 2 illustrates the lighting device 1c according to an embodiment of the invention.

Referring to FIG. 2, the lighting device 1c may include a mounting unit 130 for mounting the lighting device 1c on the accessory shoe of the main body 1b. In addition, although not shown, the lighting device 1c may include a power switch, a standby display unit, or the like.

The lighting device 1c may be electrically connected to several terminals disposed on the accessory shoe, may receive power from the terminals, and may perform communication of various information with the main body 1b. For example, a light-emitting timing signal of auxiliary light, light-emitting color information of auxiliary light, and a standby signal of auxiliary light may be transmitted or received to or from the lighting device 1c and the main body 1b.

A Fresnel lens may be mounted on the light emitting unit 127 in order to set light distribution characteristics of auxiliary light. A lens to be mounted on the light emitting unit 127 is not limited to a Fresnel lens and may be a general light-transmitting lens. In addition, when the light emitting unit 127 uses a lens-embedded LED lamp as a light source, the light emitting unit 127 may not include a separate lens.

Hereinafter, various embodiments of the light emitting unit 127 disposed on the lighting device 1c will be described with reference to FIGS. 3A and 3B.

Figure 3A:
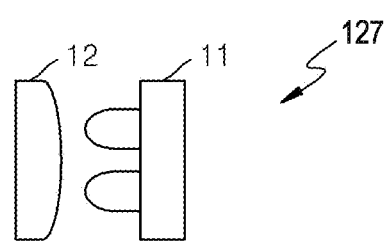
FIGS. 3A and 3B are views of a light emitting unit according to an embodiment of the invention.
Figure 3B:
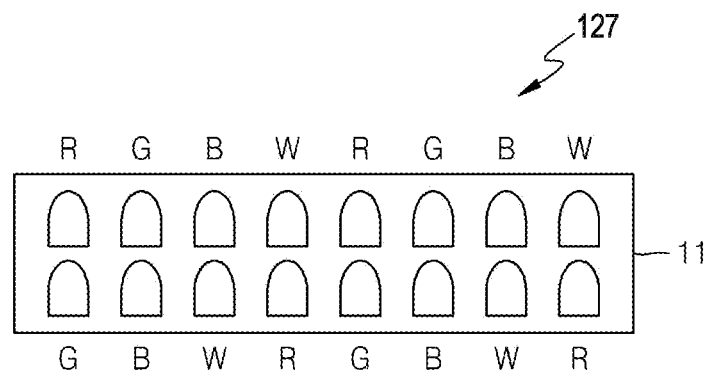

FIGS. 3A and 3B illustrate the light emitting unit 127 according to an embodiment of the invention. FIG. 3A is a side view of the light emitting unit 127, and FIG. 3B is a front view of the light emitting unit 127 of FIG. 3A. The light emitting unit 127 may include a light-emitting device unit 11 and a light-transmitting lens 12.

The light-emitting device unit 11 may be a solid state light-emitting device, such as an LED, an OLED, an EL display, or an OLET. The light-transmitting lens 12 may be disposed on an upper portion of the light emitting device unit 11 and may be a lens having a dome shape.

As shown in FIG. 3B, LEDs having four colors, such as red (R), green (G), blue (B), and white (W), are installed on top and bottom ends of the light-emitting device unit 11. By adjusting an emission output of each color, an emission color may be changed.

Colors that constitute the light-emitting device unit 11 are just an example, and aspects of the invention are not limited thereto. For example, the light-emitting device unit 11 may include a combination of three color elements, such as R, G, and B, or a combination of six color elements, such as R, G, B, cyan (C), magenta (M), and yellow (Y). In addition, although, in the present embodiment, the light emitting device unit 11 includes 16 light emitting devices, the light emitting device unit 11 may include three or more light emitting devices.

In the light emitting unit 127 according to the present embodiment, auxiliary light having various color temperatures may be irradiated onto a subject. In this case, three colors used as colors of the light emitting devices, such as R, G, and B, may be the same colors used for a color filter of the image capturing device 108, if possible. Thus, efficiency of controlling white balance may be improved.

Figure 4A:
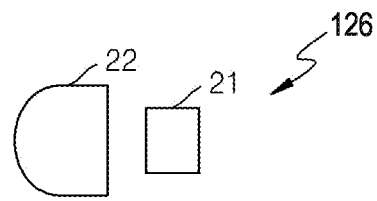
FIGS. 4A and 4B are views of an auxiliary light device according to an embodiment of the invention.
Figure 4B:
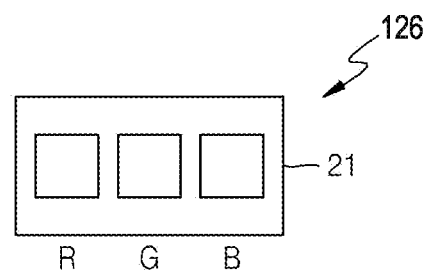

FIGS. 4A and 4B illustrate the auxiliary light device 126. FIG. 4A is a side view of the auxiliary light device 126, and FIG. 4B is a front view of the auxiliary light device 126 of FIG. 4A. The auxiliary light device 126 may include a light-emitting device unit 21 and a light-transmitting lens 22.

The auxiliary light device 126 may include three light-emitting pellets, and each of the light-emitting pellets emits light of colors R, G, and B, as shown in FIG. 4B. The light-emitting device unit 21 may be a solid state light-emitting device, such as an LED, an OLED, an OLET, or an EL display. The light-transmitting lens 22 may be disposed on an upper portion of the light-emitting device unit 21 and may be a lens having a dome shape.

The amount of emission of each color or the ratio of the amount of emission between colors may be controlled by adjusting the amount of current that flows through the light-emitting device unit 21, thus adjusting an emission color. In addition, when the light-emitting device unit 21 and the light-transmitting lens 22 are used for the auxiliary light device 126, or when AE, AWB, or AF detection is performed, all colors of light may be emitted so that light emitted is white. Alternatively, when a color for detecting AF is green, only a green light-emitting device may emit light.

Although the light-emitting device unit 21 and the light-transmitting lens 22 according to the present embodiment are used for the auxiliary light device 126, aspects of the invention are not limited thereto, and the light-emitting device unit 21 and the light-transmitting lens 22 may be used as the light emitting unit 127 of the lighting device 1c disposed outside the photographing device. In addition, only one light-emitting device unit 21 is included in the present embodiment; however, the amount of emission may be increased by mounting a plurality of light-emitting device units 21.

Figure 5A:
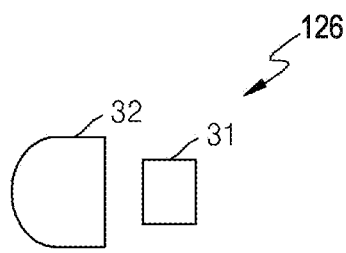
FIGS. 5A and 5B are views of an auxiliary light device according to another embodiment of the invention.
Figure 5B:
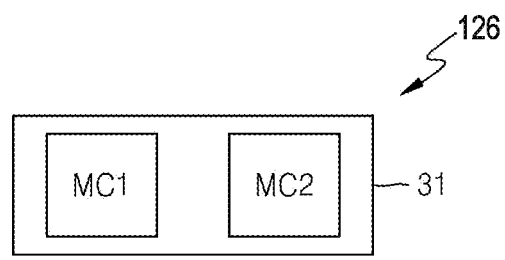

FIGS. 5A and 5B illustrate the auxiliary light device 126 according to another embodiment of the invention. FIG. 5A is a side view of the auxiliary light device 126, and FIG. 5B is a front view of the auxiliary light device 126 of FIG. 5A. The auxiliary light device 126 may include a light-emitting device unit 31 and a light-transmitting lens 32.

The light emitting device unit 31 may include two light-emitting pellets MC1 and MC2, and each of the light-emitting pellets MC1 and MC2 may modulate an emission color. That is, a wavelength shift may occur in the light-emitting pellets MC1 and MC2 included in the light-emitting device unit 31. In this case, light-emitting devices of the light-emitting device unit 31 have different modulation ranges. For example, a color temperature of emitted light may be controlled using a combination of the pellet MC1, which may be mainly modulated at a long wavelength side, and the pellet MC2, which may be mainly modulated at a short wavelength side. Light emitted from the light-emitting device unit 31 may be used as photographing auxiliary light by adjusting a color temperature of the light. Of course, the light emitted from the light-emitting device unit 31 may be used in AE, AWB, and AF detection.

Although the light-emitting device unit 31 and the light-transmitting lens 32 according to the present embodiment are used for the auxiliary light device 126, aspects of the invention are not limited thereto, and the light-emitting device unit 31 and the light-transmitting lens 22 may be used as the light emitting unit 127 of the lighting device 1c disposed outside the photographing device. In addition, only one light-emitting device unit 31 is included in the present embodiment; however, the amount of emission may be increased by mounting a plurality of light-emitting device units 31.

Figure 6A:
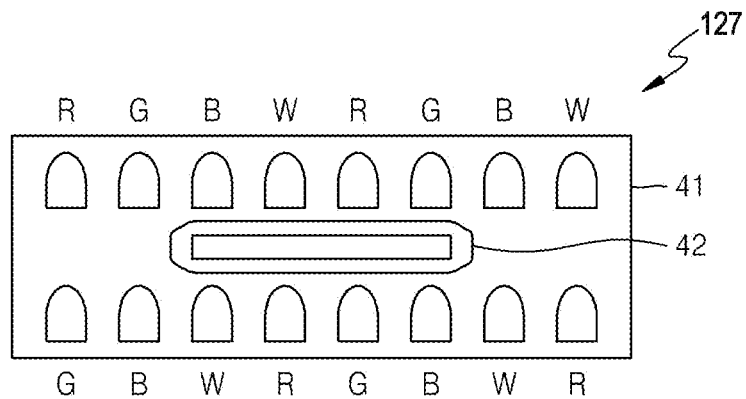
FIGS. 6A and 6B are views of a light emitting unit according to another embodiment of the invention.
Figure 6B:
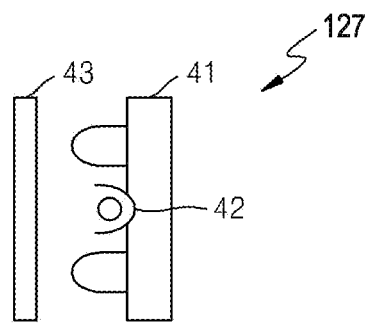

FIGS. 6A and 6B illustrate the light emitting unit 127 according to another embodiment of the invention. FIG. 6A is a front view of the light emitting unit 127, and FIG. 6B is a side view of the light emitting unit 127 of FIG. 6A.

In the present embodiment, the light emitting unit 127 may further include a xenon lamp 42 as well as a light-emitting device unit 41 including a solid state light-emitting device and a light-transmitting lens 43. The xenon lamp 42 is disposed in order to increase a range of photographing auxiliary light. The light-emitting device unit 41 includes LEDs each having a dome-shaped lens, wherein the LEDs emit R, G, and B lights.

In the present embodiment, when a still image is captured, the light-emitting device unit 41 and the xenon lamp 42 may be simultaneously turned on, or only the xenon lamp 42 may be turned on, and when a moving picture is captured, only the light-emitting device unit 41 may be continuously on.

Figure 7A:
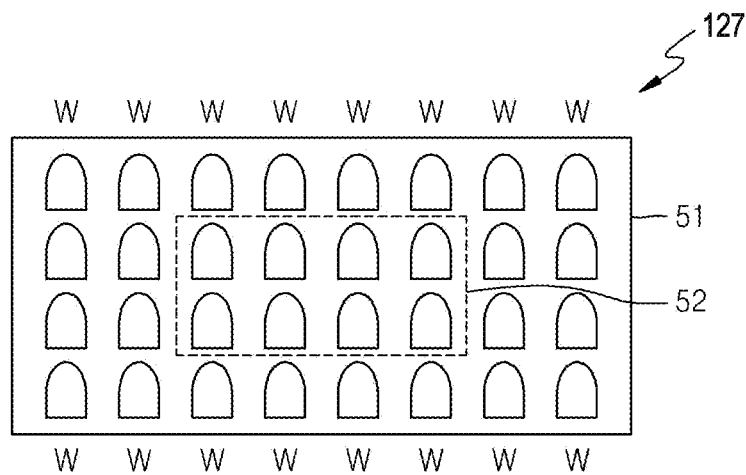
FIGS. 7A and 7B are views of a light emitting unit according to another embodiment of the invention.
Figure 7B:
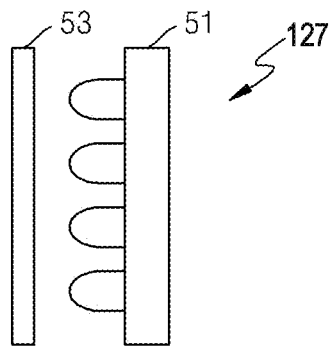

FIGS. 7A and 7B illustrate the light emitting unit 127 according to another embodiment of the invention. FIG. 7A is a front view of the light emitting unit 127, and FIG. 7B is a side view of the light emitting unit 127 of FIG. 7A. The light emitting unit 127 includes a light-emitting device unit 51 and a Fresnel lens 53.

The light-emitting device unit 51, as a light source, may include a white LED having a dome-shaped lens. In the present embodiment, LEDs are arranged in four rows widthwise. Eight white LEDs 52 disposed in a central region of the light-emitting device unit 51 are used as an AF auxiliary light source for irradiating a focus detection region. All the LEDs may be used as a photographing auxiliary light source.

The light-emitting device unit 51 may be controlled by static current control or static voltage control such that the amount of emission of the light-emitting device unit 51 may be maintained at a predetermined value, or the above two methods, i.e., static current control and static voltage control, may be simultaneously used. Furthermore, when a still image is captured, the light-emitting device unit 51 may be controlled with a relatively high current or voltage to emit light for a relatively short time, and when a moving picture is captured, the light-emitting device unit 51 may be controlled with a relatively low current or voltage to emit light for a relatively long time. When the light-emitting device unit 51 is used as an AF auxiliary light source, the light-emitting device unit 51 may be controlled with a relatively high current or voltage during an AF period.

When the light emitting unit 127 is used as an auxiliary light source for AE detection or a monitoring light of a subject, all the LEDs of the light-emitting device unit 51 may be turned on.

Figure 8A:
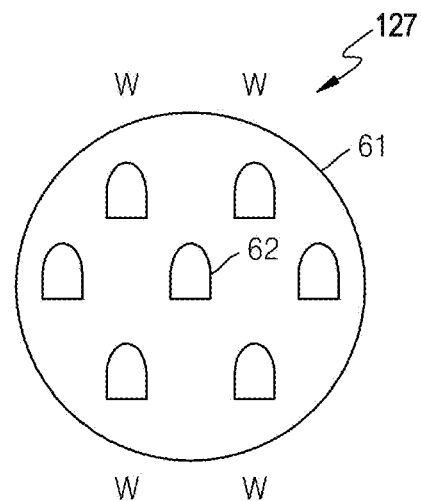
FIGS. 8A and 8B are views of a light emitting unit according to another embodiment of the invention.
Figure 8B:
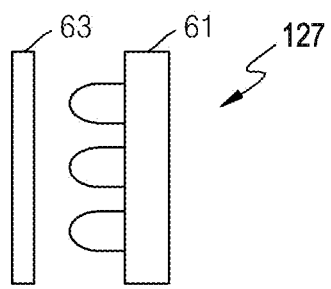

FIGS. 8A and 8B illustrate the light emitting unit 127 according to another embodiment of the invention. FIG. 8A is a front view of the light emitting unit 127, and FIG. 8B is a side view of the light emitting unit 127 of FIG. 8A. The light emitting unit 127 includes a light-emitting device unit 61 and a Fresnel lens 63.

The light-emitting device unit 61 may include white LEDs as light sources each having a dome-shaped lens. In the present embodiment, white LEDs are arranged in a circular form. One white LED 62 among the white LEDs is disposed in the center of the light-emitting device unit 61 and may be used as an AF auxiliary light source for irradiating a focus detection region or a monitoring light. To this end, an irradiation angle of the light emitting unit 127 may be designed to be wide.

When the central LED 62 is used as a monitoring light, the LED 62 may be controlled with a relatively low current or voltage to emit light for a relatively long time, and when the central LED 62 is used as an AF auxiliary light source, the LED 62 may be controlled with a relatively high current or voltage to emit light during an AF period.

When a still image is captured, all LEDs of the light-emitting device unit 61 may be controlled with a relatively high current or voltage to emit light for a relatively short time, and when a moving picture is captured, all LEDs of the light-emitting device unit 61 may be controlled with a relatively low current or voltage to emit light for a relatively long time.

Figure 9:
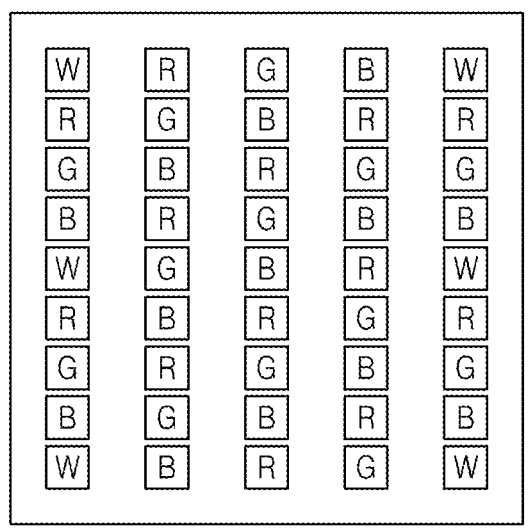
FIG. 9 is a view of a light emitting unit according to another embodiment of the invention.

FIG. 9 illustrates the light emitting unit 127 according to another embodiment of the invention.

Referring to FIG. 9, a light-emitting device unit 71 of the light emitting unit 127 may include 45 light-emitting pellets as light sources arranged in five columns and in nine rows. Each of the 45 light-emitting pellets emits W, R, G, and B color lights. The light-emitting device unit 71 may be a solid state light-emitting device, such as an LED or an EL display.

The amount of emission of each color or the ratio of the amount of emission between colors may be controlled by adjusting the amount of current that flows through the light-emitting device unit 71, thus adjusting an emission color.

When the light-emitting device unit 71 is used as an AF auxiliary light source, all the pellets may be turned on in order to emit light. However, for energy efficiency, only pellets that emit green and white lights, which are sensitively detected when used in AF detection, may be turned on.

In addition, although not shown, a light-transmitting lens or an aperture panel having a non-reflection structure may be further disposed on a front side of the light-emitting device unit 71.

Figure 10:
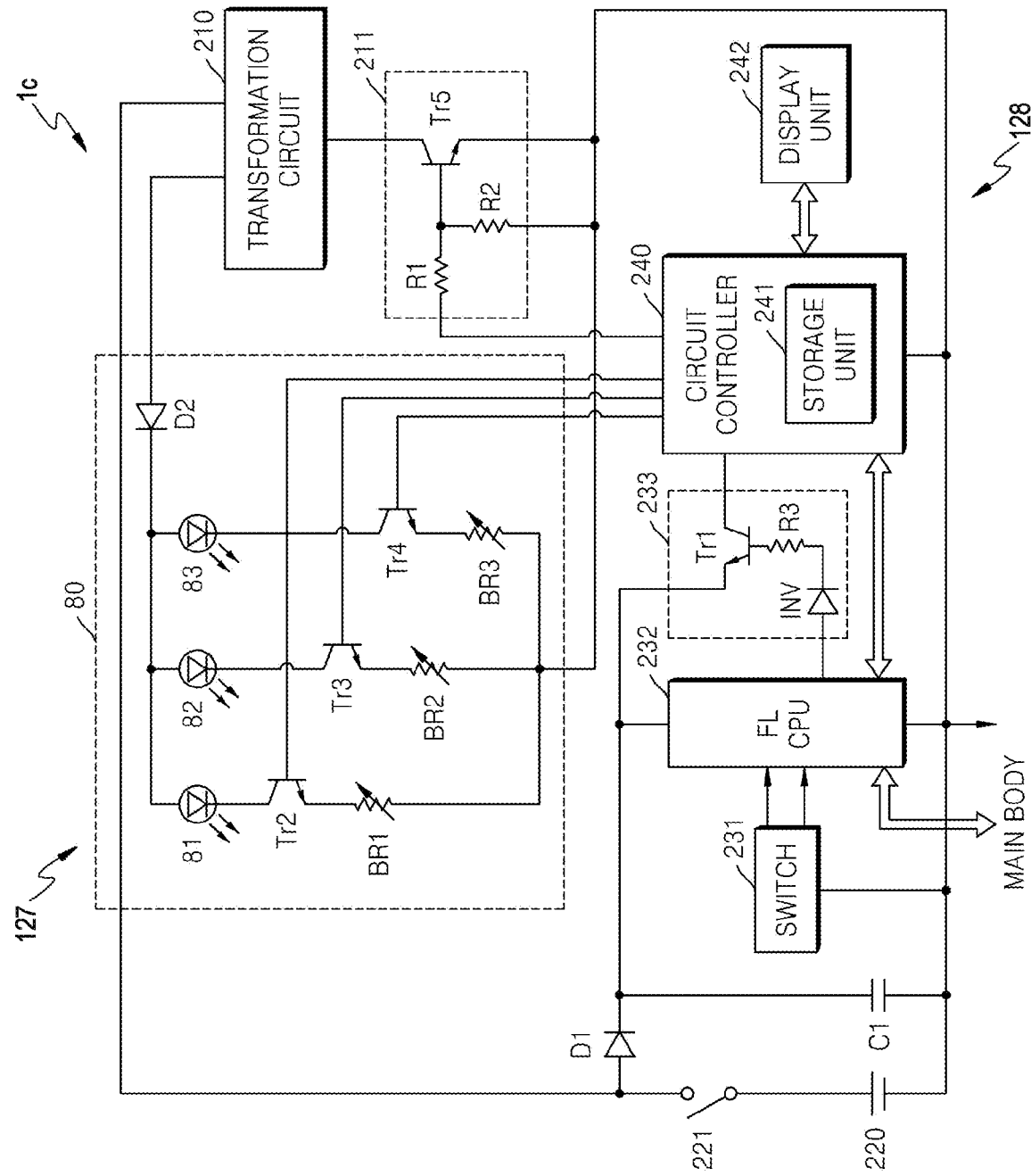
FIG. 10 is a circuit diagram of a lighting device according to an embodiment of the invention.

FIG. 10 is a circuit diagram of the lighting device 1c according to an embodiment of the invention.

Referring to FIG. 10, the light emitting unit 127 of the lighting device 1c may include a R LED 81, a G LED 82, and B LED 83 as a light-emitting device unit 80, and transistors Tr2, Tr3 and Tr4 that control emission of the R LED 81, the G LED 82, and the B LED 83, respectively. However, this is just an example, and colors and types of the light-emitting device unit 80 of the light emitting unit 127, and the number of light-emitting device units 80 may be modified in various ways. In addition, the light emitting unit 127 may further include variable resistors BR1 to BR3 for adjusting the amount of emission of the red LED 81, the G LED 82, and the B LED 83, respectively. The variable resistors BR1 to BR3 may be configured to be controlled by a circuit controller 240 in real-time.

A base of the transistor Tr2, which controls emission of an LED, is connected to the circuit controller 240. A voltage distribution circuit that distributes a power supply voltage may be disposed inside the circuit controller 240. A static current circuit may be configured by a combination of the voltage distribution circuit and the variable resistor BR1. A current value of the static current circuit may be adjusted by modifying resistances of resistors in the voltage distribution circuit and the variable resistor BR1. Similar to the transistor Tr2, the transistors Tr3 and Tr4 may be connected to the circuit controller 240 and may be controlled with a static current.

In this case, the circuit controller 240 may change an emission mode such that, when a still image is captured, light is emitted with a relatively high current for a relatively short time, and when a moving picture is captured, light is emitted with a relatively low static current for a relatively long time.

A Fluorescent Lamp (FL) CPU 232 controls the entire operation of the lighting device 1c convergently. When the FL CPU 232 is mounted on the main body 1b, the FL CPU 232 communicates with the main body 1b to transmit or receive data and signals to or from the main body 1b.

The circuit controller 240 controls emission of the LEDs of the light emitting unit 127. The circuit controller 240 may include a storage unit 241, and control values of the R LED 81, the G LED 82, and the B LED 83 may be received from the main body 1b of the photographing device and may be stored in the storage unit 241 by performing communication with the main body 1b of the photographing device. For example, when the light emitting unit 127 is used as an AF auxiliary light source, the light emitting unit 127 may record the control values so that the G LED 82 or all of the R LED 81, the G LED 82, and the B LED 83 emit light.

In the present embodiment, the amount of emission is adjusted by controlling the resistances of the variable resistors BR1 to BR3, and an emission color is adjusted based on the amount of emission. However, aspects of the invention are not limited thereto. For example, the amount of emission and emission color of the LEDs may be controlled by controlling turn on/off of the transistors Tr2 to Tr4 using pulse voltages and by controlling the duty ratio of the pulse voltages. Alternatively, the amount of emission and emission color may be controlled by varying current values for control. As described above, by adjusting the amount of emission of the LEDs, ranges of light from the LEDs, color temperature correction amounts, or the like may be controlled.

In addition, the light-emitting controller 128 includes a transformation circuit 210 including a DC/DC transformer and a transformation control circuit 211. The transformation circuit 210 supplies a predetermined voltage to an LED via a diode D2. The transformation control circuit 211 constitutes part of an inverter of the transformation circuit 210 and controls driving (start, stop, boosting, voltage drop, etc.) of the transformation circuit 210 by controlling turn on/off of a transistor Tr5. In this case, turn on/off of the transistor Tr5 is controlled by the circuit controller 240.

A power supply battery 220 is connected to the light emitting unit 127 in parallel and supplies power required for emission. In addition, the transformation circuit 210 and the transformation control circuit 211 are connected in series and are connected to the power supply battery 220 in parallel via a power switch 221.

Another diode D1 is a diode for preventing reverse charge, and a condenser C1 is a large-capacity capacitor for reducing lowering of a voltage for driving the FL CPU 232 by operating the transformation circuit 210. A switch 231 allows setting of an emission color temperature of light emitted by an LED of the light emitting unit 127 to be changed.

A circuit 233 including a transistor Tr1, an inverter INV, and a resistor R3 is a circuit for stably controlling a driving voltage of the circuit controller 240. The FL CPU 232 outputs an on/off driving signal to the transistor Tr1 via the inverter INV and maintains the driving voltage supplied to the circuit controller 240 at a constant level.

Although the circuit of FIG. 10 includes the light emitting unit 127 and the light-emitting controller 128, aspects of the invention are not limited thereto. That is, the circuit of FIG. 10 may be applied to the auxiliary light controller 125 and the auxiliary light device 126.

Figure 11:
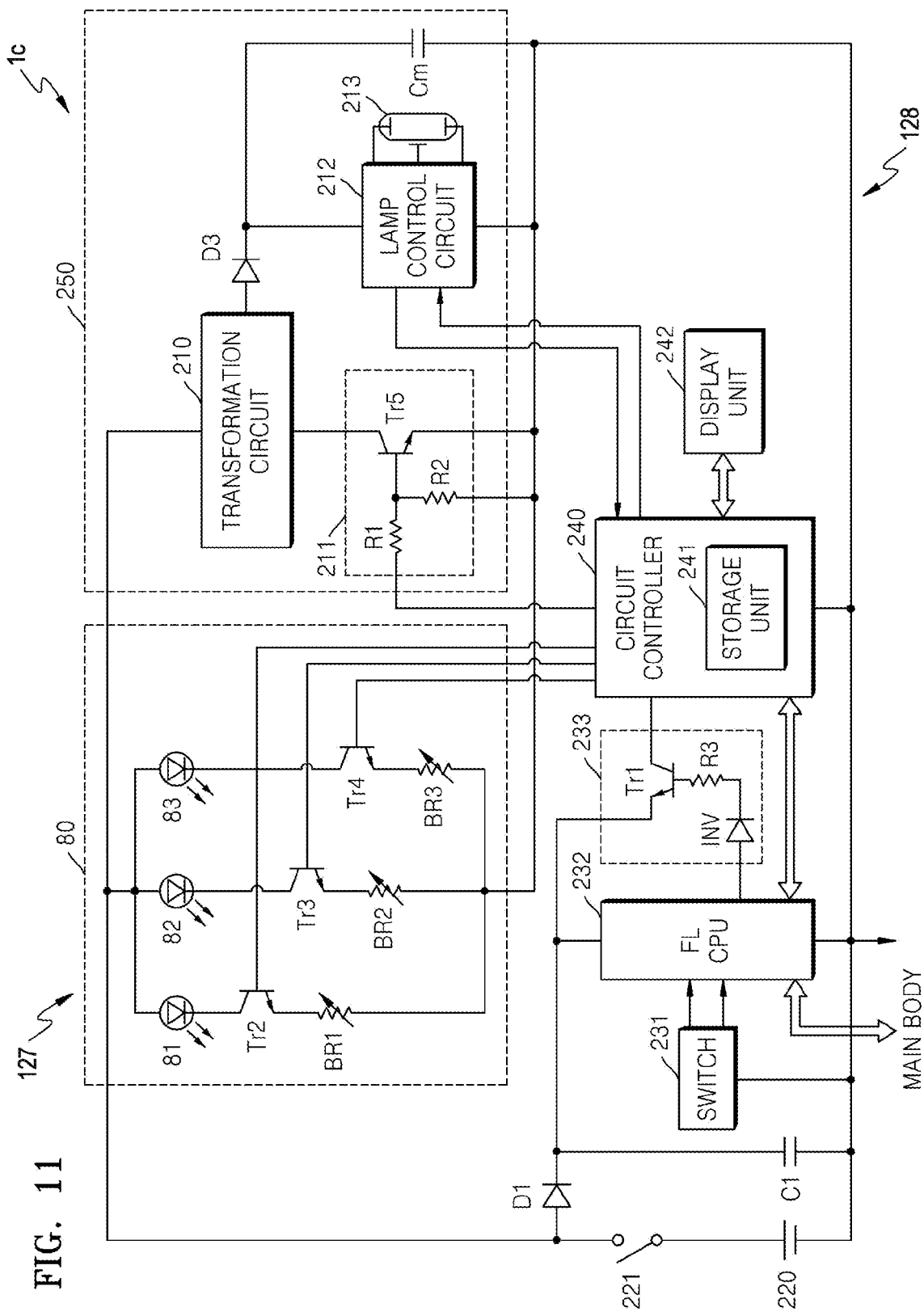
FIG. 11 is a circuit diagram of a lighting device according to another embodiment of the invention.

FIG. 11 is a circuit diagram of the lighting device 1c according to another embodiment of the invention.

In the present embodiment, the lighting device 1c may further include a lamp light emitting unit 250 as a light emitting unit, as well as the light-emitting device unit 80. Consumed power and volume of the lighting device 1c of FIG. 11 are increased compared to those of the lighting device 1c of FIG. 10; however, an auxiliary light range may be increased compared to that of the lighting device 1c of FIG. 10.

A difference between the lighting device 1c of FIG. 11 and the lighting device 1c of FIG. 10 is that, in the present embodiment, the light-emitting device unit 80 uses a voltage supplied from the power voltage battery 220 (not from the transformation circuit 210). A static current circuit is configured like as shown in FIG. 10.

The lamp light emitting unit 250 includes a xenon lamp 213 that generates flash light, a lamp control circuit 212 that controls emission of the xenon lamp 213, and a main condenser Cm that accumulates discharge energy of the xenon lamp 213. In addition, the lamp light emitting unit 250 includes the transformation circuit 210 for performing charge of the main condenser Cm and the transformation control circuit 211 including the switch transistor Tr5 for controlling charge of the main condenser Cm.

The transformation control circuit 211 constitutes part of the inverter of the transformation circuit 210 and controls driving (start, stop, boosting, voltage drop etc.) of the transformation circuit 210 by controlling turn on/off of the transistor Tr5. In this case, turn on/off of the transistor Tr5 is controlled by the circuit controller 240.

A circuit in which the transformation circuit 210 and the transformation control circuit 211 are connected in series, is connected to the power supply battery 220 via the power switch 221. An output terminal of the transformation circuit 210 is connected to the lamp control circuit 212 and the main condenser Cm via a rectification diode D3.

For flash photographing in which the xenon lamp 213 is used, the lighting device 1c boosts a power supply voltage to a predetermined voltage using the transformation circuit 210, applies the boosted voltage to the main condenser Cm, and accumulates electrical energy required for flash emission.

The lamp control circuit 212 controls discharge of the electrical energy accumulated on the main condenser Cm to the xenon lamp 213. Discharge timing and stop timing of the main condenser Cm are controlled by the circuit controller 240.

Figure 12:
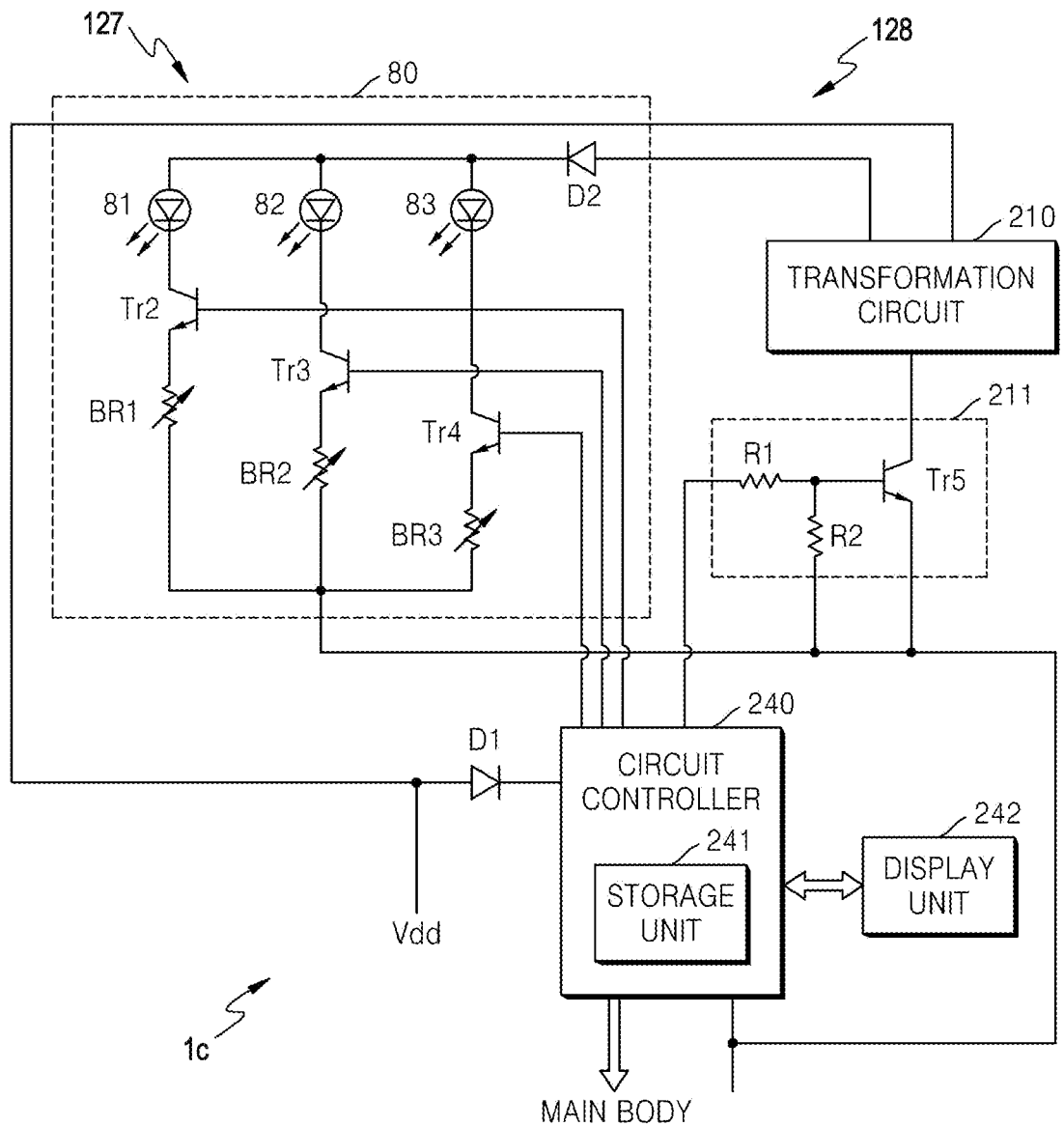
FIG. 12 is a circuit diagram of a lighting device according to another embodiment of the invention.

FIG. 12 illustrates the light emitting controller 128 according to another embodiment of the invention.

In the present embodiment, a power supply circuit is not disposed inside the lighting device 1c. A power supply voltage required for an operation of the lighting device 1c is supplied from the main body 1b via a power supply line Vdd of the accessory shoe formed in the main body 1b.

In addition, in the present embodiment, a CPU is not disposed inside the lighting device 1c, and the CPU 106 of the main body 1b controls the circuit controller 240.

As described above, since the light device 1c uses the power supply circuit and the CPU of the main body 1b, the lighting device 1c may be miniaturized. In addition, the size of the light emitting unit 127 may be increased compared to the size of the auxiliary light device 126 embedded in the lighting device 1c so that the amount of emission may be increased.

In the present embodiment, the power supply voltage and a voltage used in the light emitting device unit 80 are controlled by the transformation circuit 210. Other configurations of FIG. 12 are the same as the configurations of FIG. 10.

Hereinafter, a method of controlling the lighting device 1c will be described with reference to FIGS. 13 through 17. In the following method, it is assumed that a photographing auxiliary light source during photographing and an AF auxiliary light source during AF detection are used due to relatively low brightness of a subject.

Figure 13:
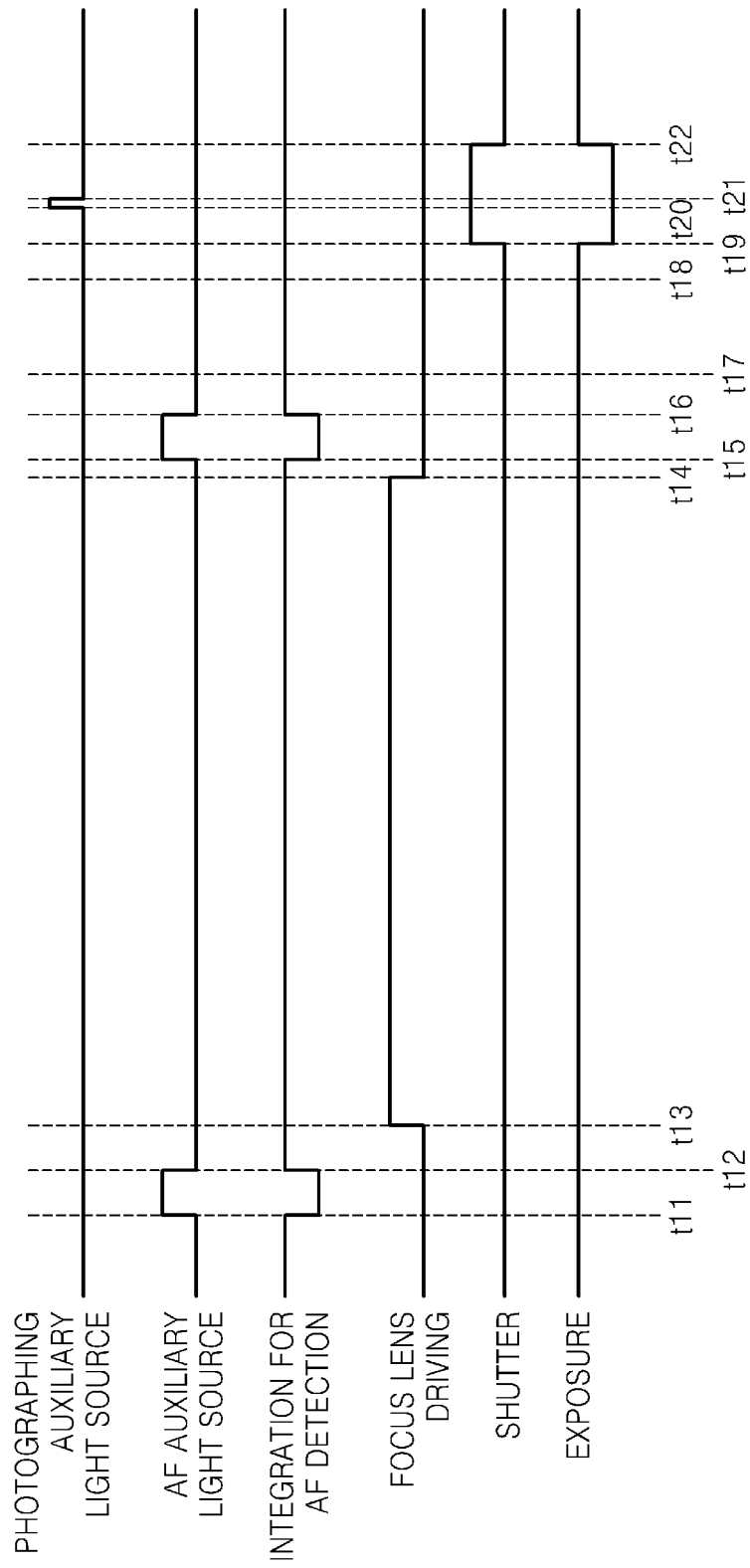
FIG. 13 is a timing diagram of an example of a method of controlling a general external attachment type lighting device.

FIG. 13 is a timing diagram of an example of a method of controlling a general external attachment lighting device. FIG. 13 illustrates a control sequence of a lighting device having a xenon lamp and a general digital single-lens reflex camera (DSLR) having a phase difference AF function. The timing diagram of FIG. 13 illustrates timing of a photographing auxiliary light source, an AF auxiliary light source, integration for AF detection, focus lens driving, a shutter, and exposure, respectively, from top to bottom.

Referring to FIG. 13, after a camera starts operating, brightness of the subject is determined to be relatively low and photographing is performed. In order to perform AF with relatively low brightness, the AF auxiliary light source in the general external attachment lighting device is turned on to emit light (t11). In phase difference AF, an LED light source that emits light having a wavelength of approximately 700 nm is used. An emission time of the AF auxiliary light source is about 50 to 100 ms and is relatively short. Since an AF sensor uses an integration method, variation in the amount of light of the LED does not affect AF results.

At the time t11, the AF sensor starts integration of light reflected from the subject and terminates integration when emission of the AF auxiliary light source is terminated (t12). A focus position is calculated, and driving of the focus lens starts towards the focus position calculated (t13). When the focus lens reaches the focus position, the focus lens stops (t14).

After the focus lens stops, the AF auxiliary light source is turned on again in order to check whether the subject is in an in-focus state, and the AF sensor restarts integration of the light reflected from the subject (t15). After a predetermined time elapsed, the AF auxiliary light source is turned off, and the integration operation is also terminated (t16).

The focus position is re-calculated, and if it is determined that the focus lens is in an in-focus state, a release operation starts (t17). In the release operation, a preparation operation relating to a shutter, an iris diaphragm, or the like is performed (t17 to t18). Thereafter, the shutter is open, and simultaneously, exposure for a still image starts (t19).

During the exposure operation, the xenon lamp of the general external attachment lighting device is turned on to emit light (t20 to t21). An emission time is generally controlled by a main body. The shutter is closed (t22), and simultaneously, the exposure operation is terminated.

As described above, in the general external attachment lighting device, an auxiliary light source for photographing and an auxiliary light source for AF are separately disposed, and the operations of FIG. 13 are performed by a battery from which a large amount of emission can be obtained, a power supply circuit, and a plurality of light source circuits.

Figure 14:
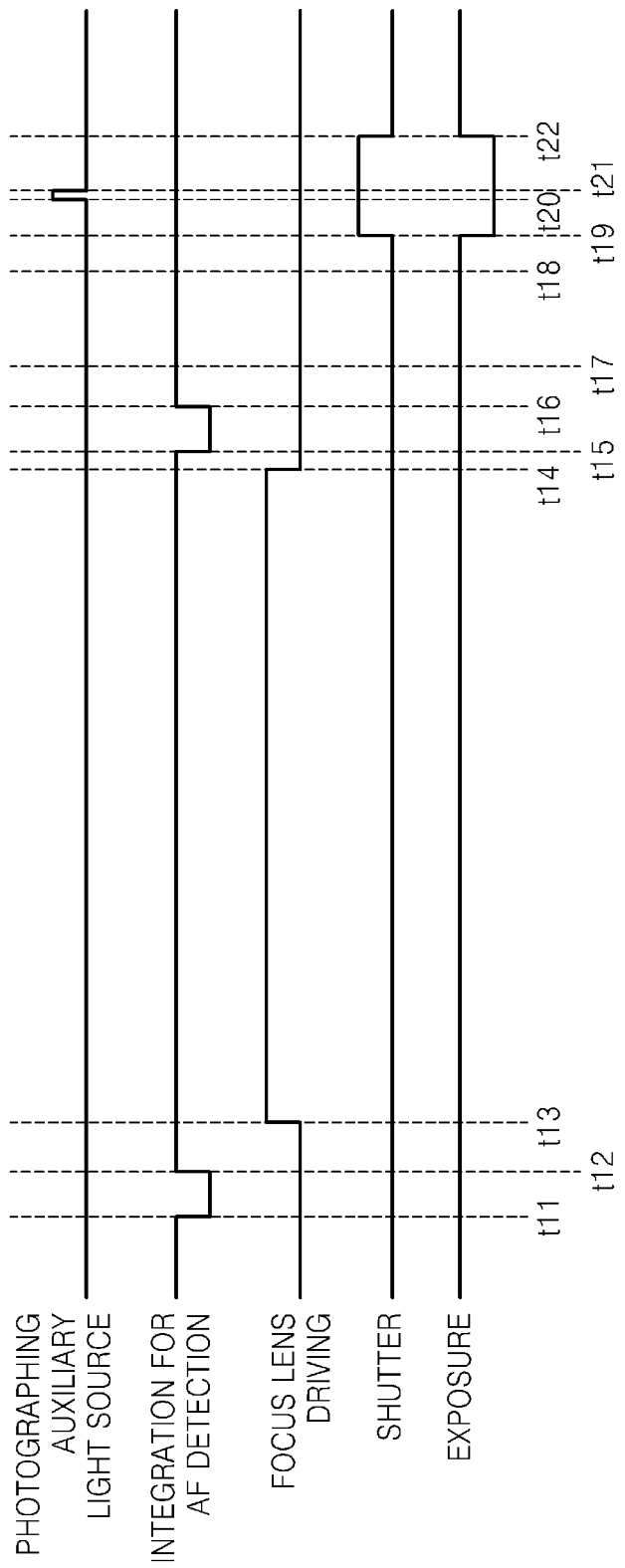
FIGS. 14 and 15 are timing diagrams of other examples of a method of controlling a general external attachment type lighting device.

FIG. 14 is a timing diagram of another example of a method of controlling a general external attachment lighting device. FIG. 14 is a timing diagram illustrating control in a flash mode in when a general LED auxiliary light device is mounted on a camera that performs phase difference AF.

Referring to FIG. 14, a flash light emitting terminal of the camera is connected to a flash light-emitting trigger of the LED auxiliary light device. Through this configuration, at time t20 between time t19 at which the shutter is open and time t22 at which a shutter is closed, a light-emitting trigger signal is generated from the camera, and the LED auxiliary light device emits light having at an amount corresponding to the light-emitting trigger signal. The LED auxiliary light device is turned off at time t21.

The above-described method is the same as an operation of a general external attachment flash camera.

Figure 15:
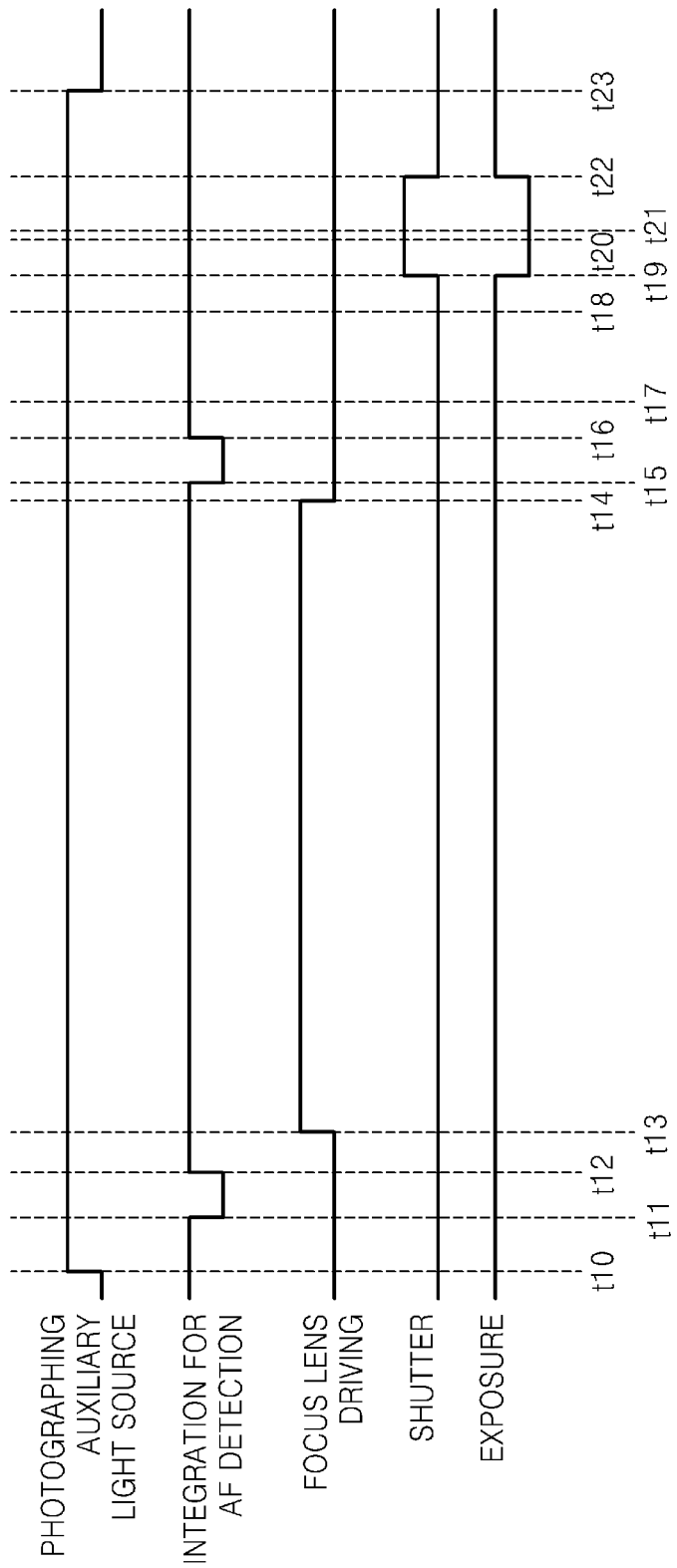

FIG. 15 is a timing diagram of another example of a method of controlling a general external attachment lighting device. FIG. 15 is a timing diagram illustrating control in a continuous emission mode when a general LED auxiliary light device is mounted on a camera that performs phase difference AF.

The continuous emission mode is generally used in capturing a moving picture. However, for comparison with other embodiments, FIG. 15 is a timing diagram when a still image is captured.

Emission and turn off of the LED auxiliary light device may be controlled by user manipulation of a switch disposed on the LED auxiliary light device. If user's switch manipulation is performed (t10), emission starts. After AF or photographing is terminated, if a user re-manipulates the switch, emission is terminated (t23).

As described above, general LED auxiliary light devices do not have a function of operating in tandem with an AF operation of a camera, and only manual manipulation can be performed. Even when general LED auxiliary light devices are mounted on a camera that performs contrast AF, an AF operation cannot be performed while the camera and the LED auxiliary light devices operate in tandem with each other.

Figure 16:
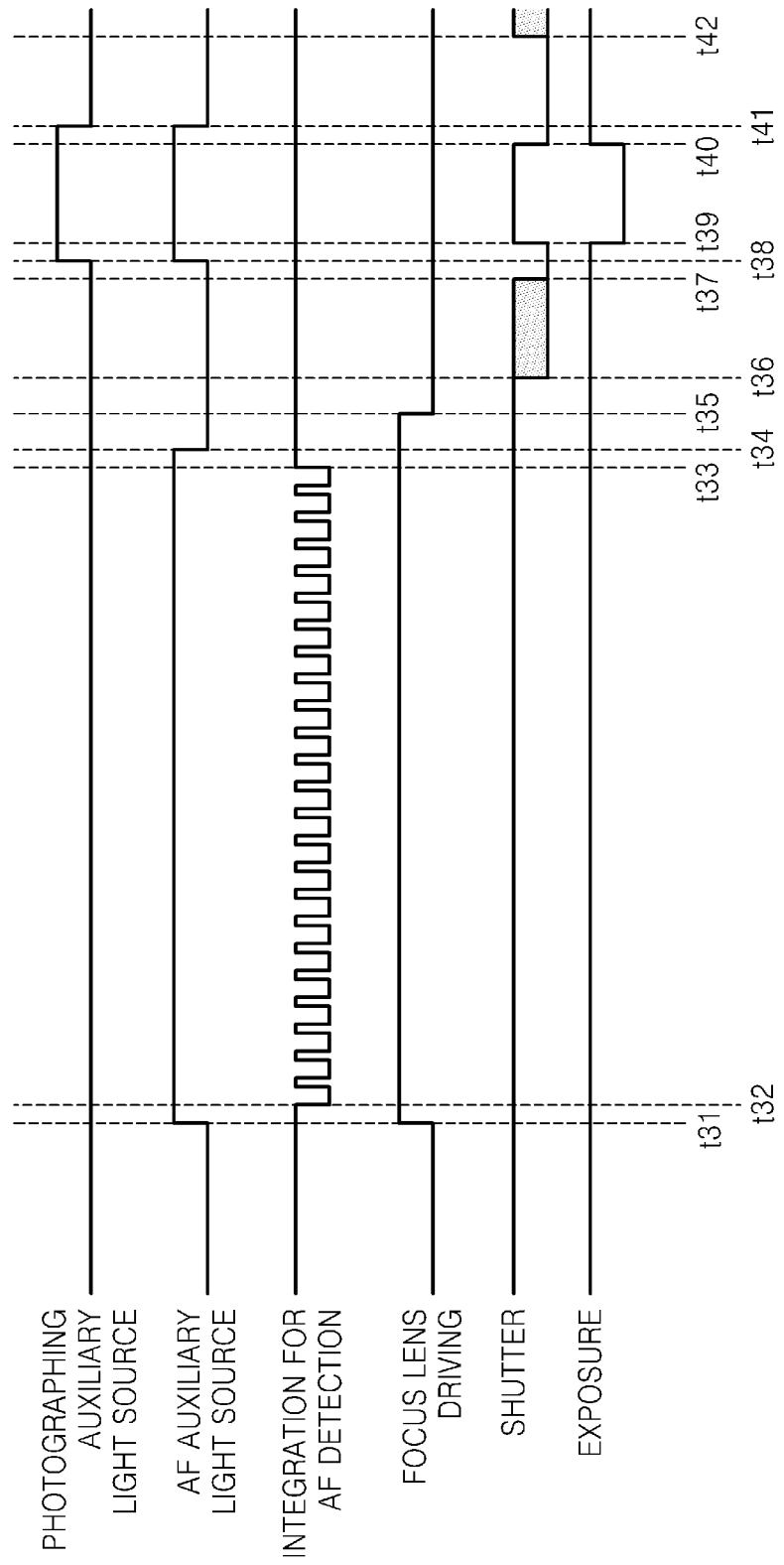
FIG. 16 is a timing diagram of a method of controlling a lighting device according to an embodiment of the invention.

FIG. 16 is a timing diagram of a method of controlling the lighting device 1c according to an embodiment of the invention.

Referring to FIG. 16, in order to perform AF with relatively low brightness, an AF auxiliary light source of the lighting device 1c is turned on to emit light (t31). In this case, as described above, only a light source set for AF auxiliary light may be turned on to emit light. That is, the light source set for AF auxiliary light may be a particular color or a white LED, a green LED, an orange LED, or a white LED disposed in a particular region.

An emission time of the AF auxiliary light source is a period in which contrast AF is performed. Due to characteristics of contrast AF, the image capturing device 108 has to perform light integration repeatedly. Thus, the AF auxiliary light source emits light continuously during the integration operation of light. In this case, the AF auxiliary light source is controlled to emit a substantially constant amount of light in order to prevent or reduce a change in contrast according to a change in the amount of light of the AF auxiliary light source. The AF period is about 100 to 1500 ms depending on an interchangeable lens. In order to turn on the AF auxiliary light source to emit a predetermined amount of light during the period, the light emitting unit 127 is controlled with a static current or static voltage circuit. This point is different from when phase difference AF is performed.

When a peak of contrast values is calculated as described above, the integration operation of the image capturing device 108 for contrast detection is terminated (t33), and emission of the AF auxiliary light source is stopped (t34). In this case, in actuality, the image capturing device 108 performs the integration operation continuously in order to display a live view image, and the AF operation using the contrast values is terminated.

When the focus lens is moved to a position of the calculated peak of the contrast values and reaches the peak position, the movement of the focus lens is terminated (t35). A release operation starts (t36). In the release operation, a preparation operation performed by a shutter, an iris diaphragm, or the like is performed (t36 to 37). In the photographing system 1 for performing contrast AF, the shutter is generally open in order to display a live view image. Thus, the shutter needs to be in a closed state first. Thus, the preparation operation of the shutter includes an operation of closing the shutter.

After the shutter is closed, emission of an auxiliary light source for photographing starts (t38). In this case, in a solid state light-emitting device of the lighting device 1c, a light emitting unit of a photographing auxiliary light source and a light emitting unit of an AF auxiliary light source may be separated from each other. Thus, in order to turn on all solid state light-emitting devices to emit light, the AF auxiliary light source is turned on to emit light.

After that, the shutter is open, and simultaneously, exposure for a still image starts (t39). An exposure time is controlled by the main body 1b. Then, the shutter is closed (t40), and simultaneously, exposure is terminated.

After that, emission of the photographing auxiliary light source including the AF auxiliary light source is terminated (t41). The photographing auxiliary light source including the AF auxiliary light source starts emission before exposure starts, and after exposure is terminated, emission of the photographing auxiliary light source including the AF auxiliary light source is terminated.

In this case, although the amount of light is guaranteed by turning on both the AF auxiliary light source and the photographing auxiliary light source to emit light, it is not necessary, and only the photographing auxiliary light source may be turned on to emit light depending on a required amount of light. In addition, in the present embodiment, light amount control is performed by an additional measuring device; however, aspects of the invention are not limited thereto. For example, pre-emission of the photographing auxiliary light source is performed before the preparation operation of the shutter is performed, and the amount of light is measured before the exposure operation, thereby determining the amount of light for the photographing auxiliary light source.

As described above, since the lighting device 1c having a configuration in which both the photographing auxiliary light source and the AF auxiliary light source are used, is used, a small-size battery, a power supply circuit, and a commonlyused light source circuit may be used. Thus, the lighting device 1c may be miniaturized, and control illustrated in FIG. 16 may be performed.

Figure 17:
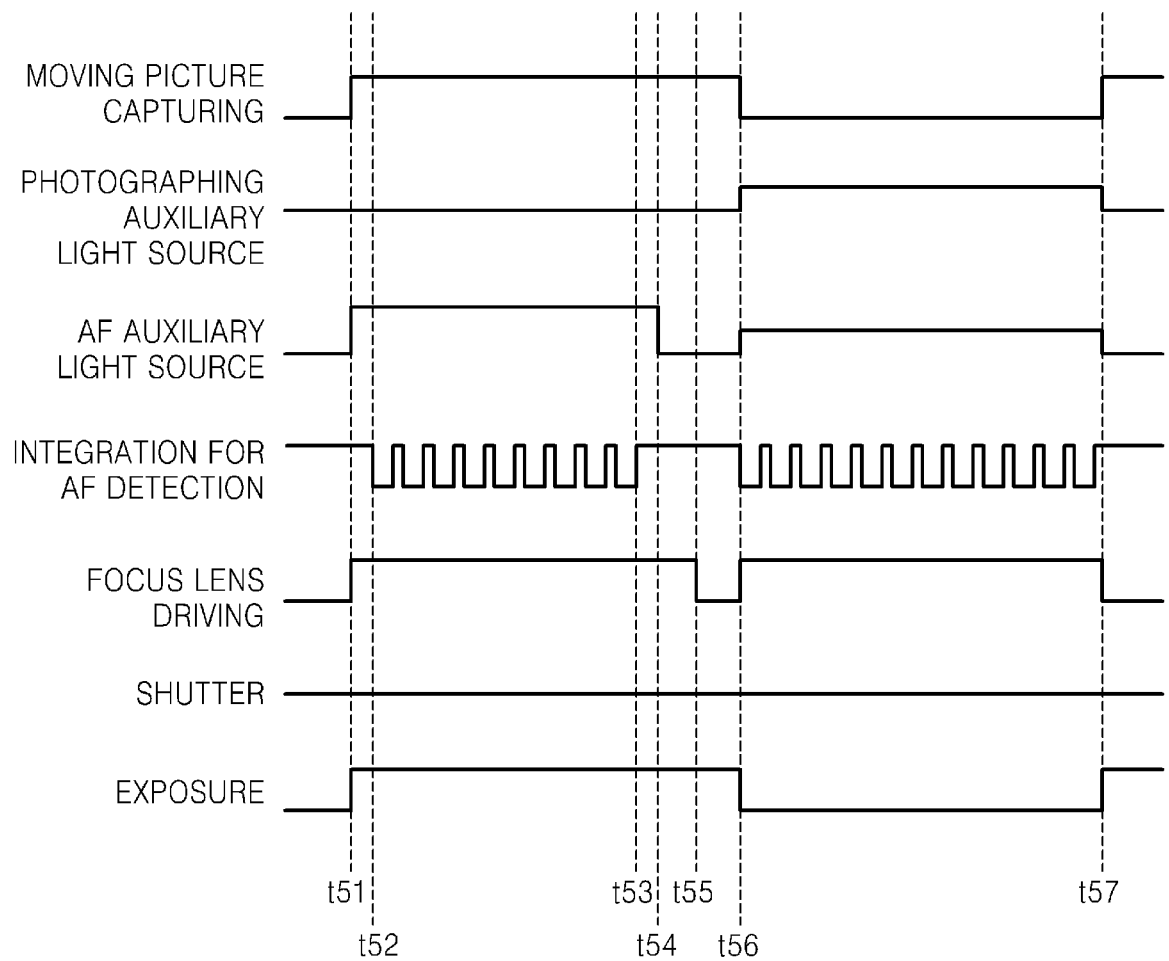
FIG. 17 is a timing diagram of a method of controlling a lighting device according to another embodiment of the invention.

FIG. 17 is a timing diagram of a method of controlling the lighting device 1c according to another embodiment of the invention. FIG. 17 is a timing diagram when a moving picture is captured.

Referring to FIG. 17, the timing diagram illustrates an AF operation before the moving picture is captured. The uppermost timing of FIG. 17 indicates start timing for capturing the moving picture.

When a release button is half pressed and a signal S1 is activated, in order to perform AF with relatively low brightness, an AF auxiliary light source of the lighting device 1c is turned on to emit light (t51), and simultaneously, driving of the focus lens starts. In this case, a light source set for AF auxiliary light is turned to emit light with relatively high brightness at a predetermined voltage or current. An emission time of the AF auxiliary light is a period in which contrast AF is performed.

When a peak of contrast values is calculated, an integration operation of the image capturing device 108 for contrast detection is terminated (t53), and emission of the AF auxiliary light source is stopped (t54). In this case, like in FIG. 16, in actuality, the image capturing device 108 performs the integration operation continuously in order to display a live view image, and the AF operation using the contrast value is terminated. When the focus lens is moved to a position of the calculated peak of the contrast values and reaches the peak position, the movement of the focus lens is terminated (t55).

Next, when a moving picture photographing start signal is generated, that is, when the release button is fully pressed and a signal S2 is activated, a moving picture capturing operation starts being performed (t56). In the moving picture capturing operation, unlike in the still image capturing operation, the shutter is not closed and is continuously open. Exposure for moving picture image capturing is performed until photographing is performed (t56 to t57).

While the moving picture capturing operation is performed, both the photographing auxiliary light source and the AF auxiliary light source are turned on to emit light continuously. In this case, a light source set for AF auxiliary light is turned on to emit light with a predetermined current or voltage and relatively low brightness. When AF is performed before photographing is performed, the focus lens needs to be in focus from large defocus, the AF auxiliary light source is turned on to emit light with relatively high brightness, and the performance of AF needs to be improved. However, when the focus lens is in an in-focus state, the focus lens is driven only in the vicinity of a focus position so that performing of AF may be reduced.

In addition, when the moving picture is captured, AF and photographing are performed for a longer time than when AF is performed before photographing is performed, generally. Thus, an auxiliary light source may be turned on to emit light for a relatively long time with relatively low brightness. Brightness in this case is lower than emission brightness when a still image is captured, as shown in FIG. 16. Contrary to this, when the still image is captured, photographing is performed for a relatively short time and thus light with relatively high brightness may be emitted, and photographing may be performed at a distance that is farther than a distance required for moving picture capturing.

Hereinafter, the operation of the photographing system 1 will be described with reference to FIGS. 18 through 20.

Figure 18:
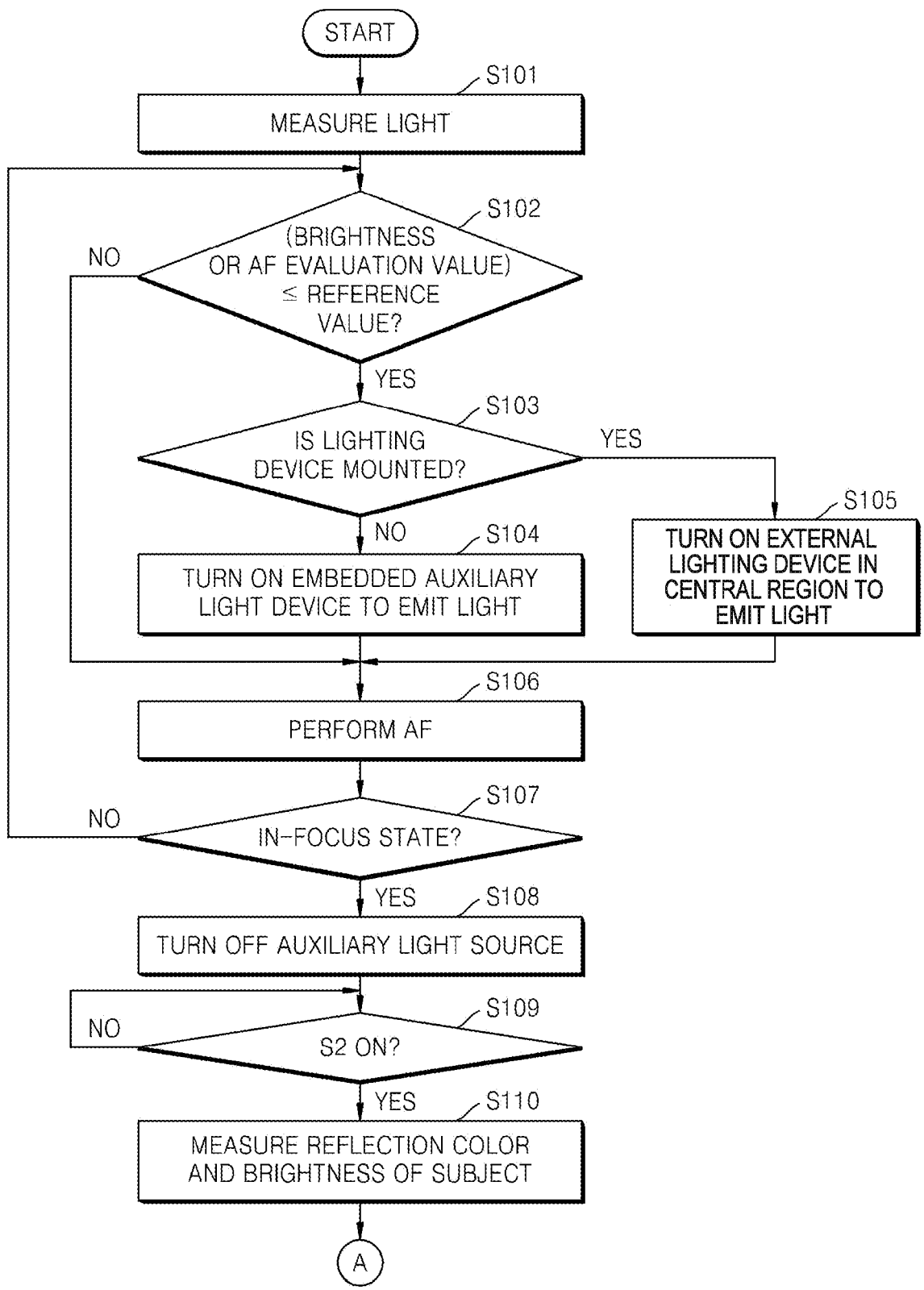
FIGS. 18 through 20 are flowcharts illustrating a method of controlling a photographing system, according to an embodiment of the invention.
Figure 19:
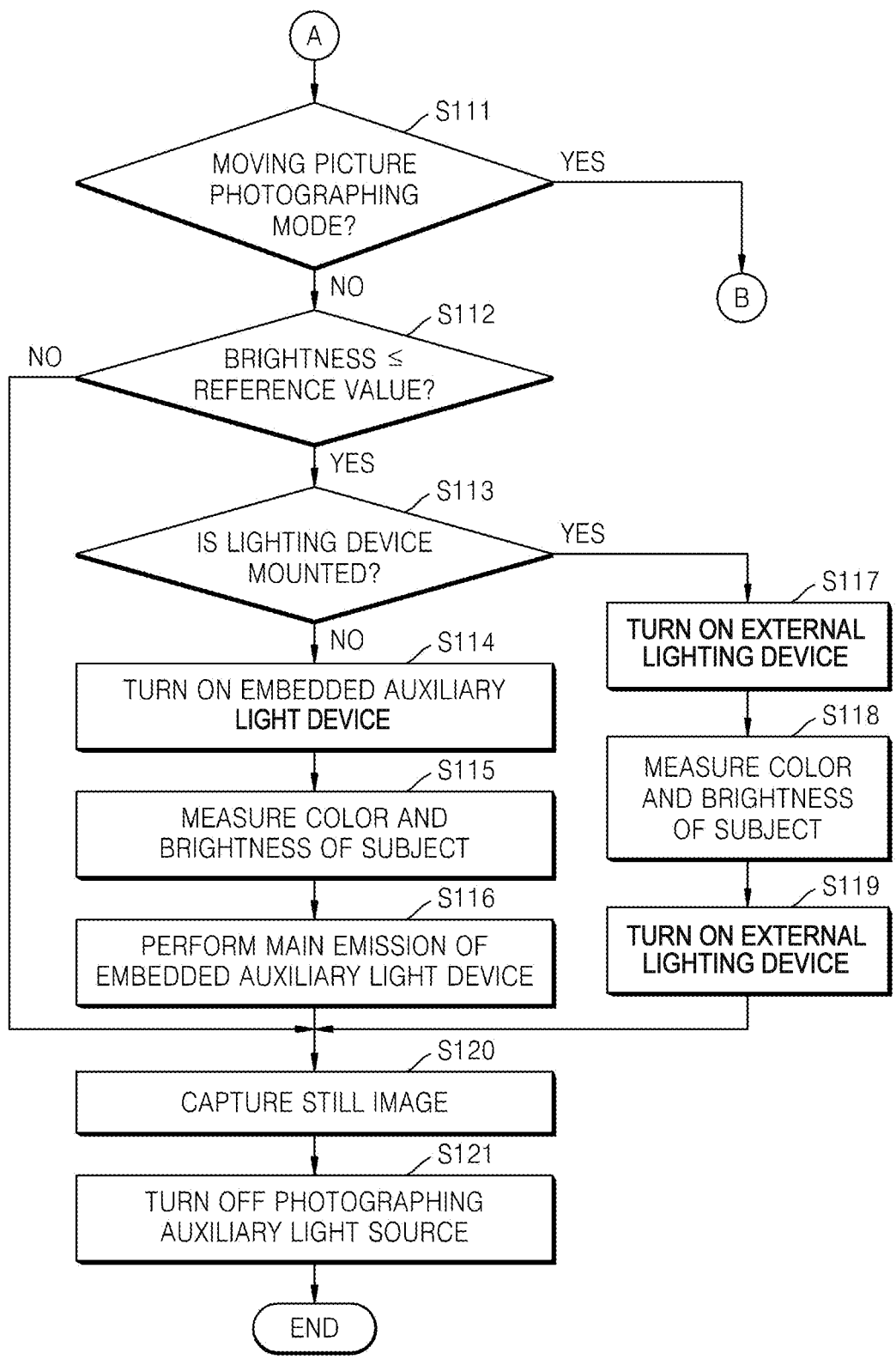
Figure 20:
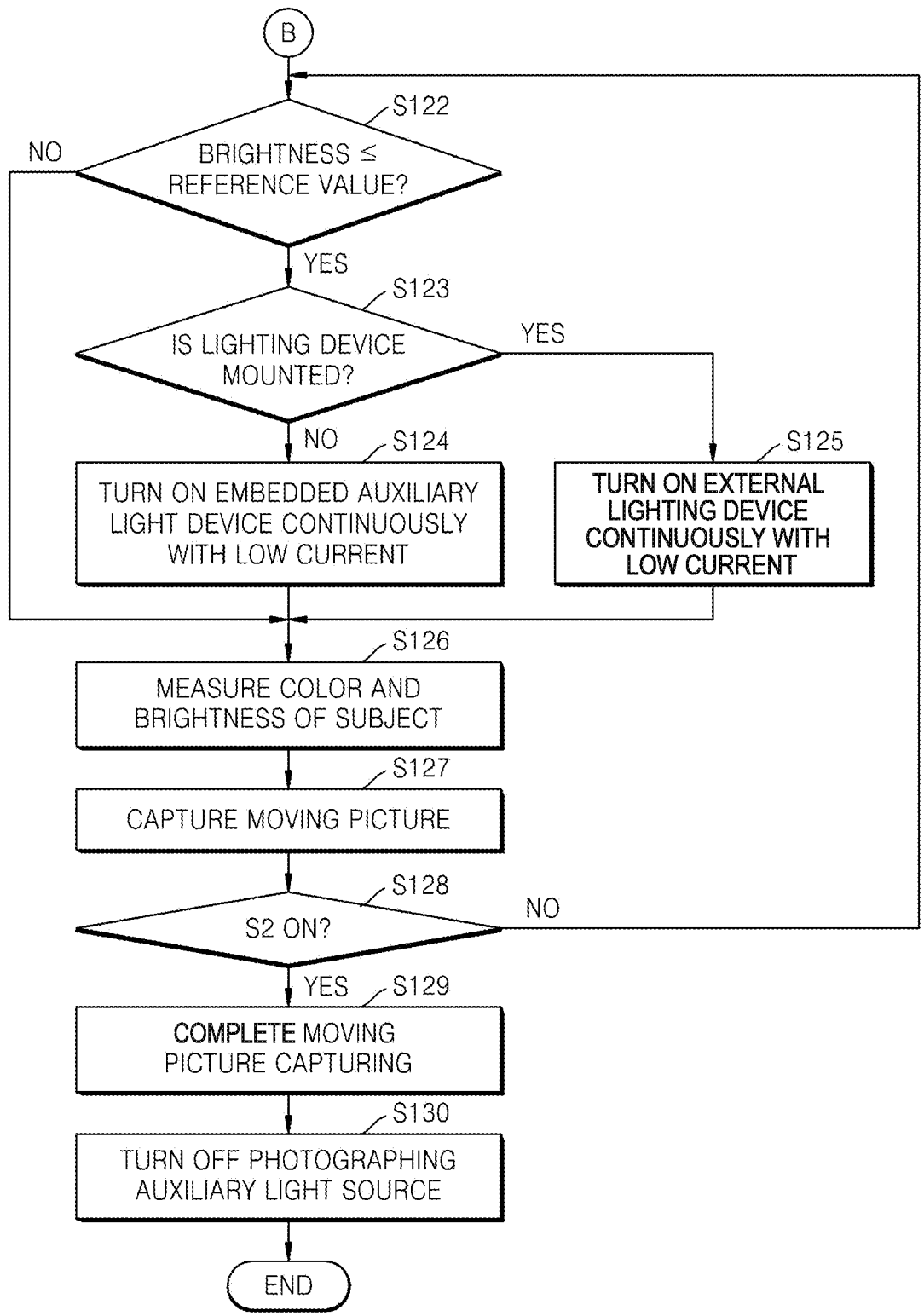

FIGS. 18 through 20 are flowcharts illustrating a method of controlling the photographing system 1, according to an embodiment of the invention. The lighting device 1c may, for example, be the light emitting unit 127 illustrated in FIGS. 3A and 3B, and the auxiliary light device 126 may be the auxiliary light device 126 illustrated in FIGS. 4A and 4B.

When the release button is half pressed and a signal 51 is activated, an operation of FIG. 18 starts being performed. First, in operation S101, light is measured, and in operation S102, it is determined whether a subject has relatively low brightness, i.e., whether brightness of the subject is equal to or less than a reference value or whether an AF evaluation value is equal to or less than the reference value. When first entering operation S102, since there is no information regarding the AF evaluation value, the AF evaluation is not compared with the reference value, and when operation S102 is performed twice or more times, the AF evaluation value is compared with the reference value.

If it is determined in operation S102 that brightness of the subject is equal to or less than the reference value or the AF evaluation value is equal to or less than the reference value, in operation S103, it is determined whether the lighting device 1c is mounted on the main body 1b. If it is determined in operation S103 that the lighting device 1c is not mounted on the main body 1b, in operation S104, the embedded auxiliary light device 126 is turned on to emit light. The auxiliary light source in this case is used as auxiliary light source for AF and is used in an AF operation. For example, a G LED as the AF auxiliary light source is turned on to emit light. However, aspects of the invention are not limited thereto, and for example, other color LEDs, such as an orange LED and the like, may be turned on to emit light. In addition, when brightness components are used in performing AF, if all R, G, and B lights are emitted, focus detection may be performed at a long distance.

If it is determined in operation S103 that the lighting device 1c is mounted on the main body 1b, in operation S105, the lighting device 1c is turned on to emit light. A predetermined LED is turned on to emit light, in order to irradiate a central screen region. That is, only an LED in a central region corresponding to a focusing region is turned on to emit light. Thus, consumed power may be reduced, and a brilliance phenomenon may be reduced.

If it is determined in operation S102 that brightness of the subject is not equal to or less than the reference value, operation S106 is performed. In operation S106, an AF operation is performed by the AF detecting unit 118. In operation S107, it is determined whether the focus lens has been moved to a focus position, by detecting a peak of contrast values. That is, it is determined whether the subject is in an in-focus state.

If it determined in operation S107 that the subject is not in an in-focus state, the method goes back to operation S102, and if it is determined in operation S107 that the subject is in an in-focus state, in operation S108, the AF auxiliary light source is turned off. Obviously, an instruction to turn off the AF auxiliary light source in the state where the AF auxiliary light source is not turned on to emit light, is meaningless.

In operation S109, it is determined whether the release button is fully pressed and a signal S2 is activated. If the signal S2 is activated, reflection color and brightness of the subject are measured in operation S110. That is, the color of the subject is measured by the AWB detecting unit 116 based on an image signal output from the image capturing device 108, and brightness of the subject is measured by the AE detecting unit 117.

After the reflection color and brightness of the subject are measured, in operation S111, it is determined whether the photographing system 1 is in a moving picture photographing mode. If a photographing mode is a still image photographing mode, it is determined whether the subject has relatively low brightness, i.e., brightness of the subject is equal to or less than the reference value in operation S112. If it is determined in operation S112 that the subject has relatively low brightness, it is determined whether the lighting device 1c is mounted on the main body 1b in operation S113.

If it is determined in operation S113 that the lighting device 1c is not mounted on the main body 1b, the embedded auxiliary light device 126 as a photographing auxiliary light source is turned on to emit light previously in operation S114. In this case, all R, G, and B color lights are emitted in such a way that white light can be emitted. In operation S115, reflection color and brightness of the subject due to pre-emission are measured, and the amount of light, emission color, and white balance for main emission are determined. If the operation is completed, all R, G, and B color lights are emitted from the embedded auxiliary light device 126, thereby performing main emission of the embedded auxiliary light device 126 in operation S116. The amount of light in the main emission operation may be set to be larger than the amount of light in the pre-emission operation. In addition, emission color may be changed by adjusting the amount of light of each LED in order to adjust color temperatures of the lights.

If it is determined in operation S113 that the lighting device 1c is mounted on the main body 1b, the lighting device 1c as a photographing auxiliary light source is turned on to emit light in operation S117. In this case, a white (W) LED of the lighting device 1c may be turned on to emit light. In operation S118, reflection color and brightness of the subject due to pre-emission are measured, and the amount of light, emission color, and white balance for main emission are determined. If the operation is completed, all W, R, G, and B color lights are emitted from the lighting device 1c, thereby performing main emission of the lighting device 1c in operation S119. The main emission operation is performed with a relatively high current in order to obtain a sufficient amount of light. In addition, since light during still image photographing is emitted for a shorter time compared to that of moving picture photographing, a relatively large current may be flown. Thus, a sufficient amount of light during photographing may be obtained by flowing a relatively large current.

Next, if operation S116 or S119 is completed, a still image is captured in operation S120. If the still image capturing operation is completed, the photographing auxiliary light source is turned off in operation S121. The still image capturing operation is terminated in the above procedure.

If it is determined in operation S111 that the photographing system 1 is in a moving picture photographing mode, it is determined whether the subject has relatively low brightness, i.e., whether brightness of the subject is equal to or less than the reference value in operation S122. If it is determined in operation S122 that the subject has relatively low brightness, it is determined whether the lighting device 1c is mounted on the main body 1b in operation S123.

If it is determined in operation S123 that the lighting device 1c is not mounted on the main body 1b, all R, G, and B color lights are continuously emitted from the embedded auxiliary light device 126 with a relatively low current in operation S124. In this case, like in still image capturing, all R, G, and B color lights are emitted in such a way that white light can be emitted. Obviously, color temperatures of the lights may be changed. In addition, although an LED as a light source has been described in the present embodiment, a light source may be another solid state light-emitting device, such as an EL display, an OLED device, an OLET, or the like.

If it is determined in operation S123 that the lighting device 1c is mounted on the main body 1b, all W, R, G, and B color lights are continuously emitted from the lighting device 1c with a relatively low current in operation S125. This is because the photographing auxiliary light source during moving picture capturing needs to be turned on to emit light for a longer time compared to in still image capturing and the light is emitted with a relatively low current in order to emit light continuously even during long-term emission.

In operation S126, reflection color and brightness of the subject are measured using the photographing auxiliary light source, and white balance, the amount of light, and emission color are set, and moving picture capturing starts being performed in operation S127.

In operation S128, it is determined whether a signal S2 is activated by pressing the release button while the moving picture is captured. If the signal S2 is not activated, the method goes back to operation S122 to perform moving picture capturing continuously, and if the signal S2 is activated, moving picture capturing is completed in operation S129. In operation S130, the photographing auxiliary light source is turned off. The operation of capturing the moving picture is completed in the above procedure.

In the current embodiment, it is determined whether the auxiliary light source is turned on to emit light while the moving picture is captured. However, the determination operation may be omitted, and the method may proceed to operation S126 from operation S128.

Figure 21:
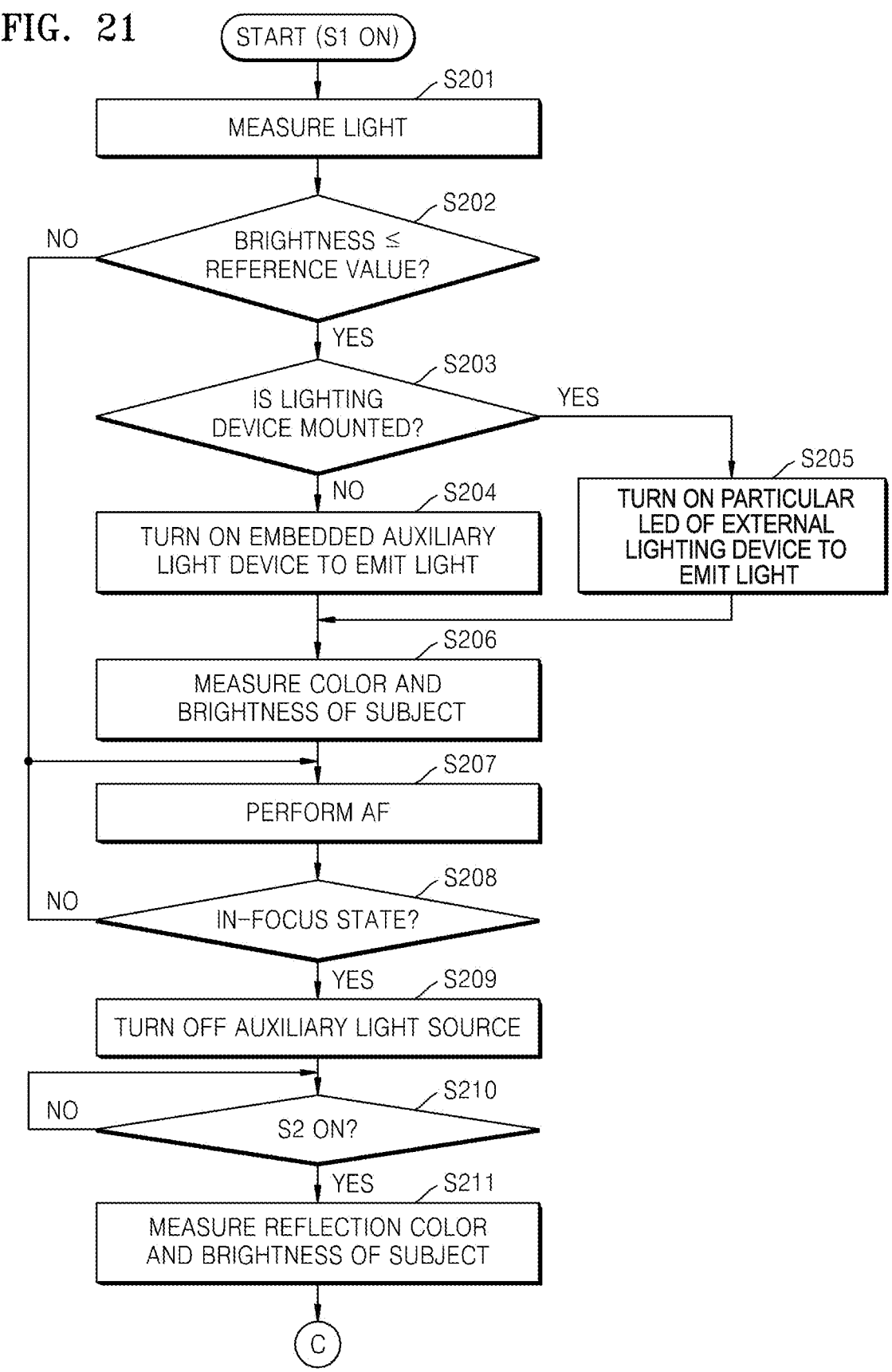
FIGS. 21 through 23 are flowcharts illustrating a method of controlling a photographing system, according to another embodiment of the invention.
Figure 22:
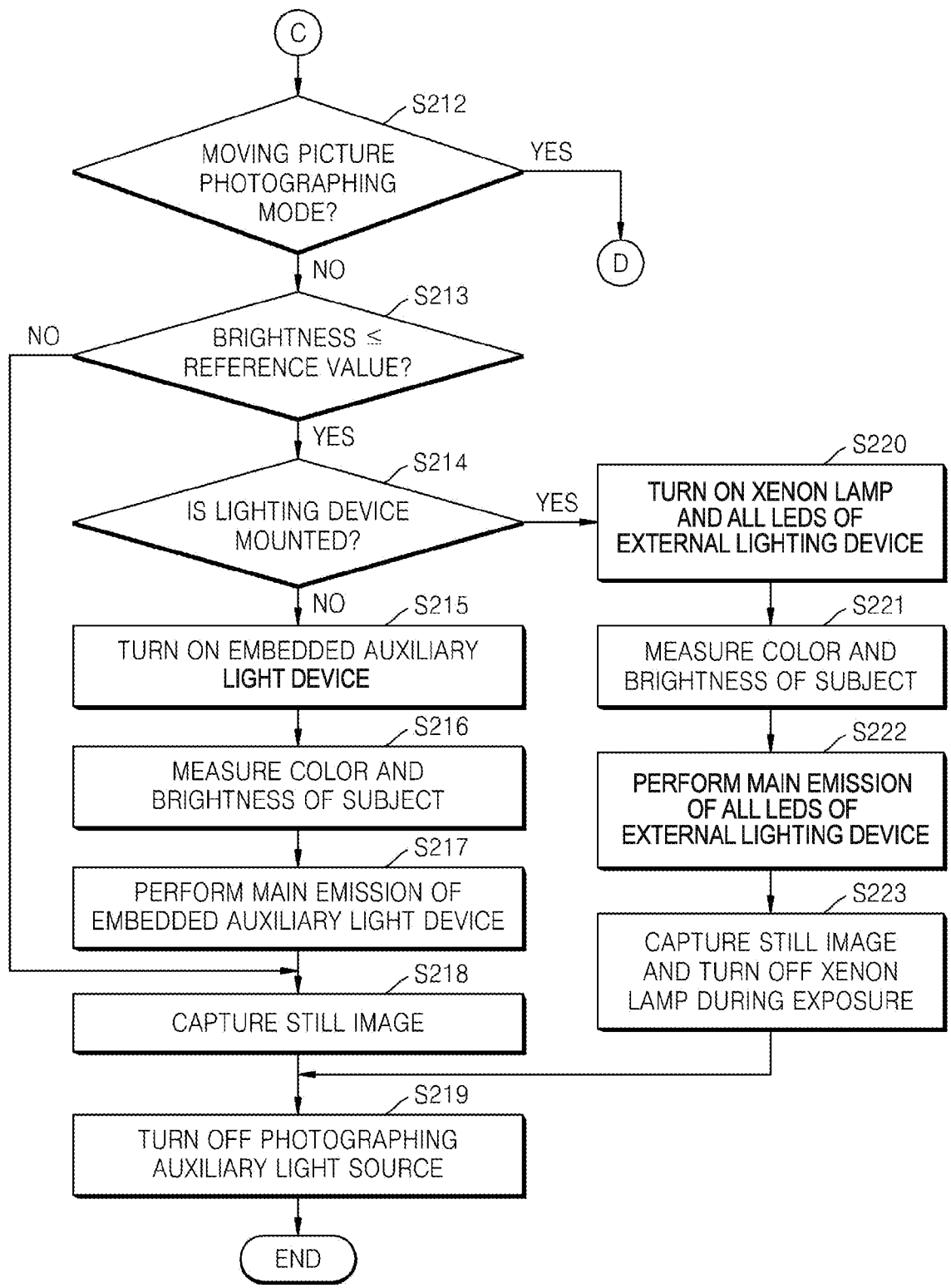
Figure 23:
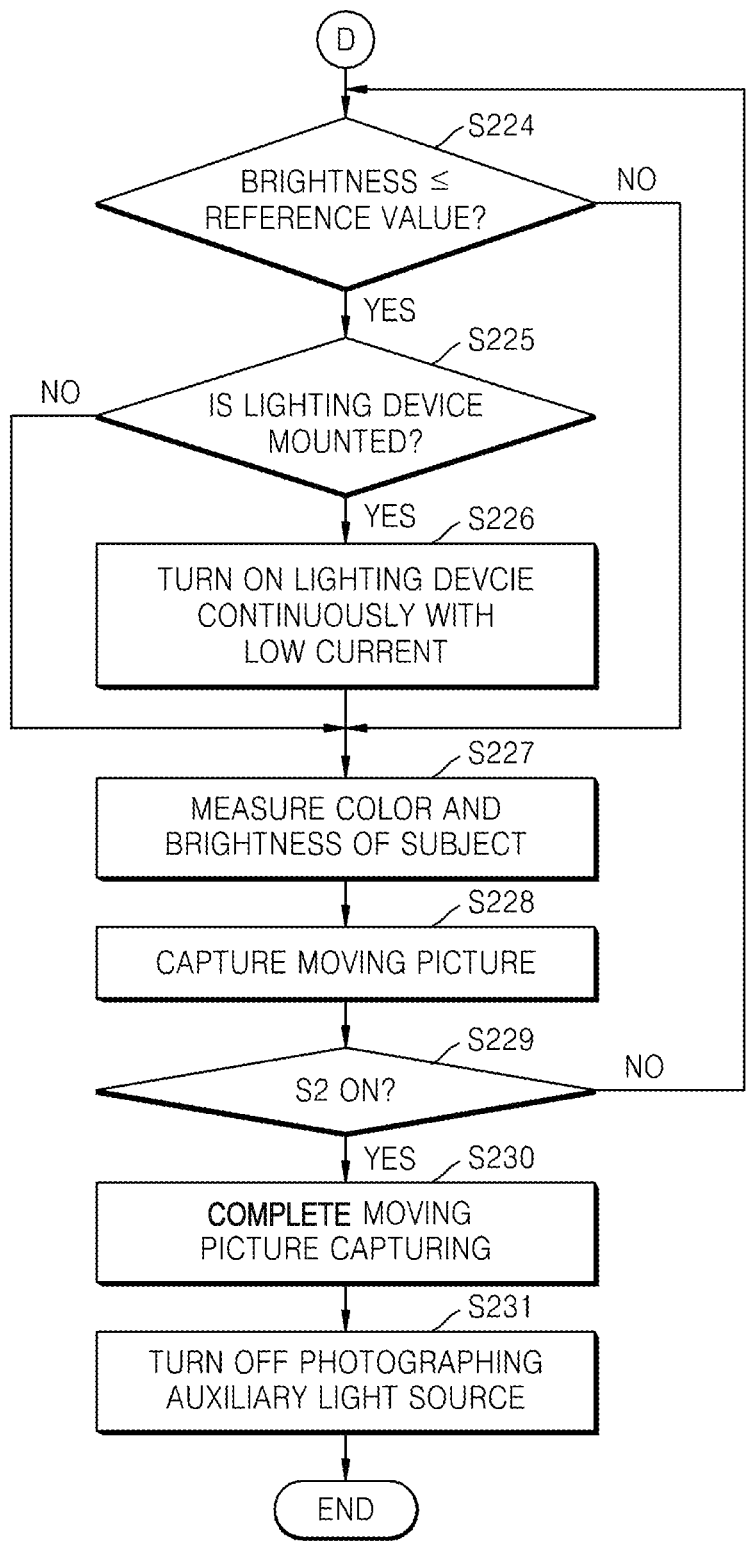

FIGS. 21 through 23 are flowcharts illustrating a method of controlling a photographing system 1, according to another embodiment of the invention. The lighting device 1c may be the light emitting unit 127 illustrated in FIGS. 6A and 6B, and the auxiliary light device 126 may be the auxiliary light device 126 illustrated in FIGS. 4A and 4B. In this case, an LED that is a solid state light-emitting device used as the lighting device 1c and the auxiliary light device 126 may be only a white (W) LED. Obviously, all R, G, and B LEDs may be used. Hereinafter, the description of configurations that are the same as those of FIGS. 17 through 20 will be omitted.

When the release button is half pressed and a signal S1 is activated, an operation of FIG. 21 starts being performed. First, in operation S201, light is measured, and in operation S202, it is determined whether a subject has relatively low brightness, i.e., whether brightness of the subject is equal to or less than a reference value or whether an AF evaluation value is equal to or less than the reference value.

If it is determined in operation S202 that brightness of the subject is equal to or less than the reference value or the AF evaluation value is equal to or less than the reference value, in operation S203, it is determined whether the lighting device 1c is mounted on the main body 1b. If it is determined in operation S203 that the lighting device 1c is not mounted on the main body 1b, in operation S204, all LEDs of the embedded auxiliary light device 126 are turned on to emit light. On the other hand, if it is determined in operation S203 that the lighting device 1c is mounted on the main body 1b, in operation S205, a particular LED of the lighting device 1c is turned on to emit light. Here, the particular LED may be an LED disposed in a particular region. In the current operation, a xenon lamp is not turned on to emit light. Color and brightness of the subject are measured to perform AWB and AE in operation S206.

If it is determined in operation S202 that brightness of the subject is not equal to or less than the reference value, operation S207 is performed. In operation S207, an AF operation is performed by an AF detecting unit 118. In operation S208, it is determined whether the focus lens has been moved to a focus position, by detecting a peak of contrast values. That is, it is determined whether the subject is in an in-focus state.

If it determined in operation S208 that the subject is not in an in-focus state, the method goes back to operation S207, and if it is determined in operation S208 that the subject is in an in-focus state, in operation S209, the AF auxiliary light source is turned off. That is, in the current embodiment, it is not determined whether the AF auxiliary light source is turned on to emit light while AF is performed.

Subsequently, the method proceeds to operations S210 to S214. In operation S214, if the lighting device 1c is mounted on the main body 1b, the lighting device 1c performs pre-emission using the xenon lamp and all LEDs in operation S220. However, in the pre-emission operation, the xenon lamp may not be turned on to emit light, in order to reduce a brilliance phenomenon.

After the pre-emission operation has been performed, reflection color and brightness of the subject are measured in operation S221, and the amount of light, emission color, and white balance for main emission are determined. If the operation is completed, all LEDs of the lighting device 1c are turned on to emit light, thereby performing main emission of the lighting device 1c in operation S222. That is, all LEDs for the AF auxiliary light source and the photographing auxiliary light source are turned on to emit light.

In operation S223, still image capturing starts being performed, and the xenon lamp is turned to emit light during exposure. In this case, it is determined that emission timings of xenon lamps and the photographing auxiliary light source do not overlap each other in consideration of emission time or emission starting time according to type of a light device. Thus, the effect of reducing load of a circuit occurs.

If the still image capturing operation is completed, a photographing auxiliary light source is turned off in operation S219. The still image capturing operation is terminated in the above procedure.

If it is determined in operation S212 that the photographing system 1 is in a moving picture photographing mode, it is determined whether the subject has relatively low brightness, i.e., whether brightness of the subject is equal to or less than a reference value in operation S224. If it is determined that brightness of the subject is equal to or less than the reference value, in operation S225, it is determined whether the lighting device 1c is mounted on the main body 1b. If it is determined in operation S224 that brightness of the subject is not equal to or less than the reference value, or if it is determined in operation 225 that the lighting device 1c is not mounted on the main body 1b, the method proceeds to operation S227. That is, photographing is performed without using the photographing auxiliary light source and it is determined that the embedded auxiliary light device 126 is not suitable for being turned on to emit light for a relatively long time.

On the other hand, if it is determined in operation S225 that the lighting device 1c is mounted on the main body 1b, all LEDs of the lighting device 1c are turned on to emit light continuously with a relatively low current in operation S226.

Next, operations S227 to S231 are performed to complete the moving picture capturing operation.

In FIGS. 18 through 23, the lighting device 1c and the auxiliary light device 126 illustrated in particular drawings have been described. However, aspects of the invention are not limited thereto. That is, the operations may be performed using a lighting device and an auxiliary light device other than the lighting device 1c and the auxiliary light device 126 illustrated in particular drawings, and various modifications and corrections may be made in the embodiments.

As described above, in the lighting device 1c and the photographing system 1 including the lighting device 1c according to the one or more embodiments of the invention, photographing auxiliary light and AF auxiliary light can be efficiently irradiated onto a subject.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A photographing system comprising:
a photographing device that captures an image; and
a lighting device that is capable of being mounted on the photographing device,
wherein the lighting device comprises a plurality of light sources configured as a solid state light-emitting device, and has a photographing auxiliary light function for allowing the solid state light-emitting device to be turned on to emit light during photographing and an autofocus (AF) auxiliary light function for allowing the solid state light-emitting device to be turned on to emit a predetermined amount of light when contrast AF is performed by the photographing device, and
wherein at least part of the light sources is shared when the photographing auxiliary light function and the AF auxiliary light function are performed.

2. The photographing system of claim 1, wherein the photographing device further comprises an auxiliary light device to be turned on to emit light when contrast AF is performed, and
wherein, when the lighting device is not mounted on the photographing device, the auxiliary light device is turned on to emit light, and when the lighting device is mounted on the photographing device, the lighting device is turned on to emit light using the AF auxiliary light function.

3. The photographing system of claim 1, wherein the solid state light-emitting device comprises one selected from the group consisting of a light emitting diode (LED), an electroluminescence (EL) display, an organic light emitting diode (OLED) device, and an organic light emitting transistor (OLET).

4. The photographing system of claim 1, wherein the photographing auxiliary light function allows all light sources of the solid state light-emitting device to emit light, and the AF auxiliary light function allows a particular light source or all light sources of the solid state light-emitting device to emit light.

5. The photographing system of claim 4, wherein the particular light source comprises a particular color or white light source, or a light source disposed in a region that covers a focus detection region.

6. The photographing system of claim 1, wherein the lighting device further comprises a xenon lamp as a light source, and the photographing auxiliary light function allows all light sources of the solid state light-emitting device and the xenon lamp to emit light.

7. The photographing system of claim 1, wherein the photographing device further comprises a shutter for controlling exposure, and when the photographing auxiliary light function is performed, emission of the solid state light-emitting device starts before the shutter is open, and after the shutter is closed, emission of the solid state light-emitting device is terminated.

8. The photographing system of claim 1, wherein, when the lighting device is mounted on the photographing device, if it is determined that the lighting device is necessary to perform AE, the photographing device allows the solid state light-emitting device of the lighting device to be turned on to emit light.

9. The photographing system of claim 1, wherein, when the lighting device is mounted on the photographing device, if it is determined that monitoring of a subject is necessary, the photographing device allows the solid state light-emitting device of the lighting device to be turned on to emit light.

10. The photographing system of claim 1, wherein, when the AF auxiliary light function is performed, an emission instruction signal is received or transmitted from or to the photographing device and the lighting device.

11. The photographing system of claim 1, wherein, when the AF auxiliary light function is performed, emission color information is received or transmitted from or to the photographing device and the lighting device.

12. The photographing system of claim 1, wherein the lighting device during moving picture capturing is turned on to emit light with a lower voltage or current than in still image capturing.

13. The photographing system of claim 1, wherein the photographing auxiliary light function is performed when brightness of a subject is equal to or less than a first reference value, and the AF auxiliary light function is performed when brightness of the subject is equal to or less than a second reference value or when a focus evaluation value cannot be obtained.

14. A lighting device that is capable of being mounted on a photographing device, the lighting device comprising:
a plurality of light sources configured as a solid state light-emitting device,
wherein the lighting device has a photographing auxiliary light function for allowing the solid state light-emitting device to be turned on to emit light during photographing and an autofocus (AF) auxiliary light function for allowing the solid state light-emitting device to be turned on to emit a predetermined amount of light when contrast AF is performed by the photographing device, and
wherein at least part of the light sources is shared when the photographing auxiliary light function and the AF auxiliary light function are performed.

15. The lighting device of claim 14, wherein the solid state light-emitting device is controlled to be turned on to emit a predetermined amount of light using a static voltage circuit or a static current circuit.

16. The lighting device of claim 14, wherein the photographing auxiliary light function allows all light sources of the solid state light-emitting device to emit light, and the AF auxiliary light function allows a particular light source or all light sources of the solid state light-emitting device to emit light.

17. The lighting device of claim 14, wherein the lighting device during moving picture capturing is turned on to emit light with a lower voltage or current than in still image capturing.

18. The lighting device of claim 14, wherein the photographing auxiliary light function is performed when brightness of a subject is equal to or less than a first reference value, and the AF auxiliary light function is performed when brightness of the subject is equal to or less than a second reference value or when a focus evaluation value cannot be obtained.

19. The lighting device of claim 14, wherein the solid state light-emitting device comprises one selected from the group consisting of a light emitting diode (LED), an electroluminescence (EL) display, an organic light emitting diode (OLED) device, and an organic light emitting transistor (OLET).

20. The lighting device of claim 14, further comprising a xenon lamp as a light source, wherein the photographing auxiliary light function allows all light sources of the solid state light-emitting device and the xenon lamp to emit light.

21. A lighting device that is capable of being mounted on a photographing device, the lighting device comprising:
a plurality of light sources configured as a solid state light-emitting device,
wherein the lighting device has a photographing auxiliary light function for allowing the solid state light-emitting device to be turned on to emit light during photographing and an autofocus (AF) auxiliary light function for allowing the solid state light-emitting device to be turned on to emit on a predetermined condition when contrast AF is performed by the photographing device, and
wherein the solid state light-emitting device during moving picture capturing is turned on to emit light with a lower voltage or current than in still image capturing.

* * * * *